US012722181B2

(12) United States Patent
Ma et al.

(10) Patent No.: US 12,722,181 B2
(45) Date of Patent: Sep. 1, 2026

(54) ADHESIVE DISPENSING CONTROL

(71) Applicant: 3M INNOVATIVE PROPERTIES COMPANY, St. Paul, MN (US)

(72) Inventors: Junyi Ma, Shanghai (CN); Ce Shang, Shanghai (CN); Yuntong Li, Shanghai (CN); Qinrong Wu, Shanghai (CN); Zhengwei Liu, Shanghai (CN); Yousheng Wang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 291 days.

(21) Appl. No.: 18/691,354

(22) PCT Filed: Sep. 15, 2021

(86) PCT No.: PCT/CN2021/118439

§ 371 (c)(1),
(2) Date: Mar. 12, 2024

(87) PCT Pub. No.: WO2023/039738

PCT Pub. Date: Mar. 23, 2023

(65) Prior Publication Data

US 2025/0135488 A1 May 1, 2025

(51) Int. Cl.
*B05C 11/10* (2006.01)

(52) U.S. Cl.
CPC ...... *B05C 11/1005* (2013.01); *B05C 11/1026* (2013.01)

(58) Field of Classification Search
CPC ........................ B05C 11/1026; B05C 11/1005
See application file for complete search history.

(56) References Cited

U.S. PATENT DOCUMENTS 3,436,359 A 4/1969 Hubin et al.
4,833,213 A 5/1989 Leir et al.
(Continued)

FOREIGN PATENT DOCUMENTS

CN 204769420 U 11/2015
CN 103372522 B 3/2016
(Continued)

OTHER PUBLICATIONS

International Search Report for PCT Application No. PCT/CN2021/118439, mailed on Jun. 16, 2022, 4 pages.

*Primary Examiner* — Vishal I Patel
(74) *Attorney, Agent, or Firm* — Vincent Pham

(57) ABSTRACT

Apparatuses, systems, and methods for dispensing a liquid are described. Apparatuses and systems can dispense a liquid in a dispense operation at a dispense rate from a start point on a substrate surface to a terminate point on the substrate surface. A measurement device can detect geometric parameters of a shape formed by the dispensed liquid on the substrate surface. Control circuitry can control at least one of an approach speed at which the dispenser approaches the start point prior to the dispense operation and an exiting speed at which the dispenser moves away from the terminate point subsequent to the dispense operation based on the detected geometric parameters of the shape. Algorithms can operate on remote or local software and control systems, or as part of an edge computing system or Internet of Things (IoT) system.

18 Claims, 9 Drawing Sheets

(56) References Cited

U.S. PATENT DOCUMENTS

| | | | |
|---|---|---|---|
| 4,988,015 A | | 1/1991 | Price |
| 5,798,409 A | | 8/1998 | Ho |
| 6,258,918 B1 | | 7/2001 | Ho et al. |
| 6,517,891 B1 | | 2/2003 | Estelle et al. |
| 8,783,210 B2 | | 7/2014 | Takayama |
| 9,817,257 B2 | * | 11/2017 | Stensvad ........... G02F 1/133305 |
| 9,931,658 B2 | | 4/2018 | Hofschulte et al. |
| 2006/0060602 A1 | | 3/2006 | Jeong |
| 2010/0055299 A1 | | 3/2010 | Church |
| 2012/0259448 A1 | | 10/2012 | Rzonca et al. |
| 2014/0080940 A1 | | 3/2014 | Lee et al. |
| 2020/0078812 A1 | | 3/2020 | Shi et al. |
| 2024/0058837 A1 | | 2/2024 | Floeder et al. |
| 2024/0075495 A1 | | 3/2024 | Floeder et al. |

FOREIGN PATENT DOCUMENTS

| | | | | | |
|---|---|---|---|---|---|
| CN | 107159490 | A | | 9/2017 | |
| CN | 105817392 | B | | 4/2018 | |
| CN | 108202011 | A | | 6/2018 | |
| CN | 108816655 | A | | 11/2018 | |
| CN | 109261445 | A | | 1/2019 | |
| CN | 109261447 | A | | 1/2019 | |
| CN | 105320110 | B | | 2/2019 | |
| CN | 106824678 | B | | 5/2019 | |
| CN | 209502127 | U | | 10/2019 | |
| CN | 110976212 | A | | 4/2020 | |
| CN | 111617933 | A | | 9/2020 | |
| CN | 213106170 | U | | 5/2021 | |
| CN | 213792514 | U | | 7/2021 | |
| CN | 110252596 | B | | 11/2021 | |
| CN | 112337730 | B | | 5/2022 | |
| DE | 102011011545 | B4 | | 9/2014 | |
| DE | 102008018881 | B4 | | 10/2020 | |
| EP | 0403280 | B1 | | 7/1995 | |
| EP | 0757232 | A2 | | 2/1997 | |
| EP | 0509323 | B1 | | 7/1997 | |
| EP | 0741349 | B1 | | 2/2001 | |
| EP | 1432526 | B1 | * | 12/2011 | ......... H05K 13/0069 |
| EP | 2998029 | B1 | | 10/2017 | |
| EP | 1969618 | B1 | * | 1/2018 | ......... B05B 17/0607 |
| GB | 1253283 | A | | 11/1971 | |
| JP | 2001-126975 | | | 5/2001 | |
| JP | 2007206936 | A | | 8/2007 | |
| JP | 2010-284568 | | | 12/2010 | |
| KR | 20070074205 | A | | 7/2007 | |
| KR | 101190939 | | | 10/2012 | |
| WO | 1987004951 | A1 | | 8/1987 | |
| WO | 2002038282 | A1 | | 5/2002 | |
| WO | 2008030262 | A1 | | 3/2008 | |
| WO | 2009070568 | A1 | | 6/2009 | |
| WO | 2019140423 | A1 | | 7/2019 | |
| WO | 2021-074744 | | | 4/2021 | |

* cited by examiner

ADHESIVE DISPENSING CONTROL

CROSS REFERENCE TO RELATED APPLICATIONS

This application is a national stage filing under 35 U.S.C. 371 of PCT/CN2021/118439, filed Sep. 15, 2021, first filed application in patent family.

BACKGROUND

Systems for dispensing adhesives typically include an inlet or internal area for holding the adhesive, and an output or tip through which adhesive is dispensed to a surface. The flow rate and the timing of adhesive dispensing can be controlled to meet needs of downstream manufacturing processes by controlling the size and location of the dispensed adhesive bead. However, systems that actively control the size and location of the bead can be overly complex and expensive for most users, especially in use cases in which high appearance standards must be met. Therefore, there is a general need to more accurately control dispensing parameters, in a cost-effective manner, while meeting standards of appearance.

SUMMARY

The present disclosure provides an apparatus comprising a dispenser configured to dispense a liquid in a dispense operation at a dispense rate from a start point to a terminate point on a substrate surface. The apparatus further comprises a measurement device configured to detect geometric parameters of a dispensed liquid on the substrate surface. The apparatus further comprises control circuitry configured to control at least one of an approach speed at which the dispenser approaches the start point prior to the dispense operation and an exiting speed at which the dispenser moves away from the terminate point subsequent to the dispense operation, based on the detected geometric parameters of the shape.

The present disclosure further provides a method for dispensing liquid. The method can comprise dispensing a liquid from a dispenser apparatus at a dispense rate from a start point on a substrate surface to a terminate point on the substrate surface. The method can further comprise detecting geometric parameters of a shape formed by the dispensed liquid on the substrate surface. The method can further comprise controlling at least one of an approach speed at which the dispenser apparatus approaches the start point prior to a dispense operation and an exiting speed at which the dispenser apparatus moves away from the terminate point subsequent to the dispense operation based on the detected geometric parameters of the shape.

The present disclosure further provides a computer-readable medium for storing operations that, when executed on control circuitry, cause the control circuitry to perform operations including dispensing a liquid at a dispense rate from a start point on a substrate surface to a terminate point on the substrate surface. The operations can further include detecting geometric parameters of a shape formed by the dispensed liquid on the substrate surface. The operations can further include controlling at least one of an approach speed at which a dispenser apparatus approaches the start point prior to a dispense operation and an exiting speed at which the dispenser apparatus moves away from the terminate point subsequent to the dispense operation based on the detected geometric parameters of the shape.

DETAILED DESCRIPTION

Adhesive-applying equipment items are varied in type, in mode of operation and in price. The available equipment starts from brushes, adhesive applicator guns and adhesive tape dispensers costing a few dollars each, to semi-automated equipment costing a few hundred dollars and then to robotic equipment costing thousands of dollars. In some customer applications, beads of adhesive should be dispensed in a uniform manner, with high levels of accuracy, in order to meet appearance standards and other standards. However, given the great variability of adhesive viscous properties, accuracy can be difficult to achieve. Adhesive automatic dispensing is further complicated by the diversity of application methods and processes.

Figure 1:
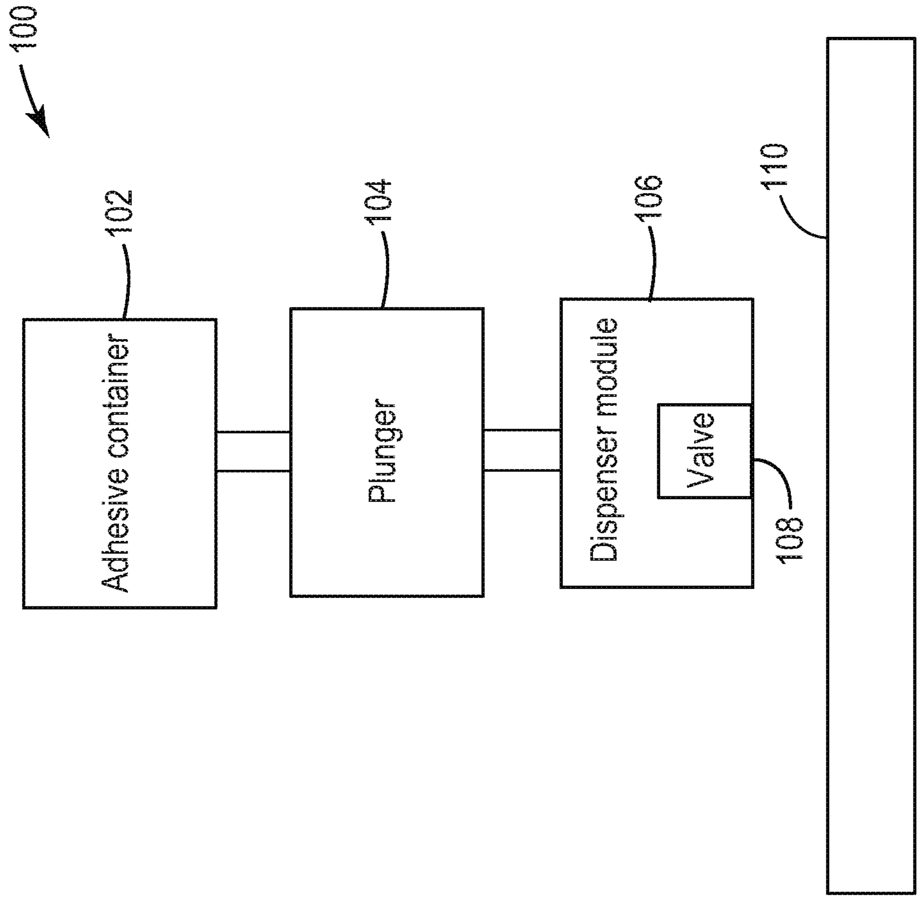
FIG. 1 is a block diagram of an adhesive dispenser in which example embodiments can be implemented.

FIG. 1 is a block diagram of an adhesive dispenser apparatus 100 in accordance with some embodiments. The adhesive dispenser is configured to deliver liquid adhesive from a source of liquid adhesive 102 to dispensing components 106 using a driving force 104, such that the liquid adhesive may be dispensed on demand using the dispensing components 106. Operators can use various settings or parameters with the dispensing components 106 to control valve 108 opening and closing, or pump speed, for example, to dispense adhesive at a desired flow rate. These settings or parameters can vary depending on a number of factors, including fluid dynamics, rheology, mechatronics control and robotics motion, which finally determine the geometry of an adhesive bead once the adhesive bead is finally dispensed onto a substrate 110.

Automated liquid adhesive dispensing may require complex path shapes depending on the product. It can be difficult to optimize these processes, particularly in areas such as corners. Furthermore, measuring the resultant adhesive bead shape is difficult for complex paths. The problem is illustrated in FIG. 2 below.

Figure 2:
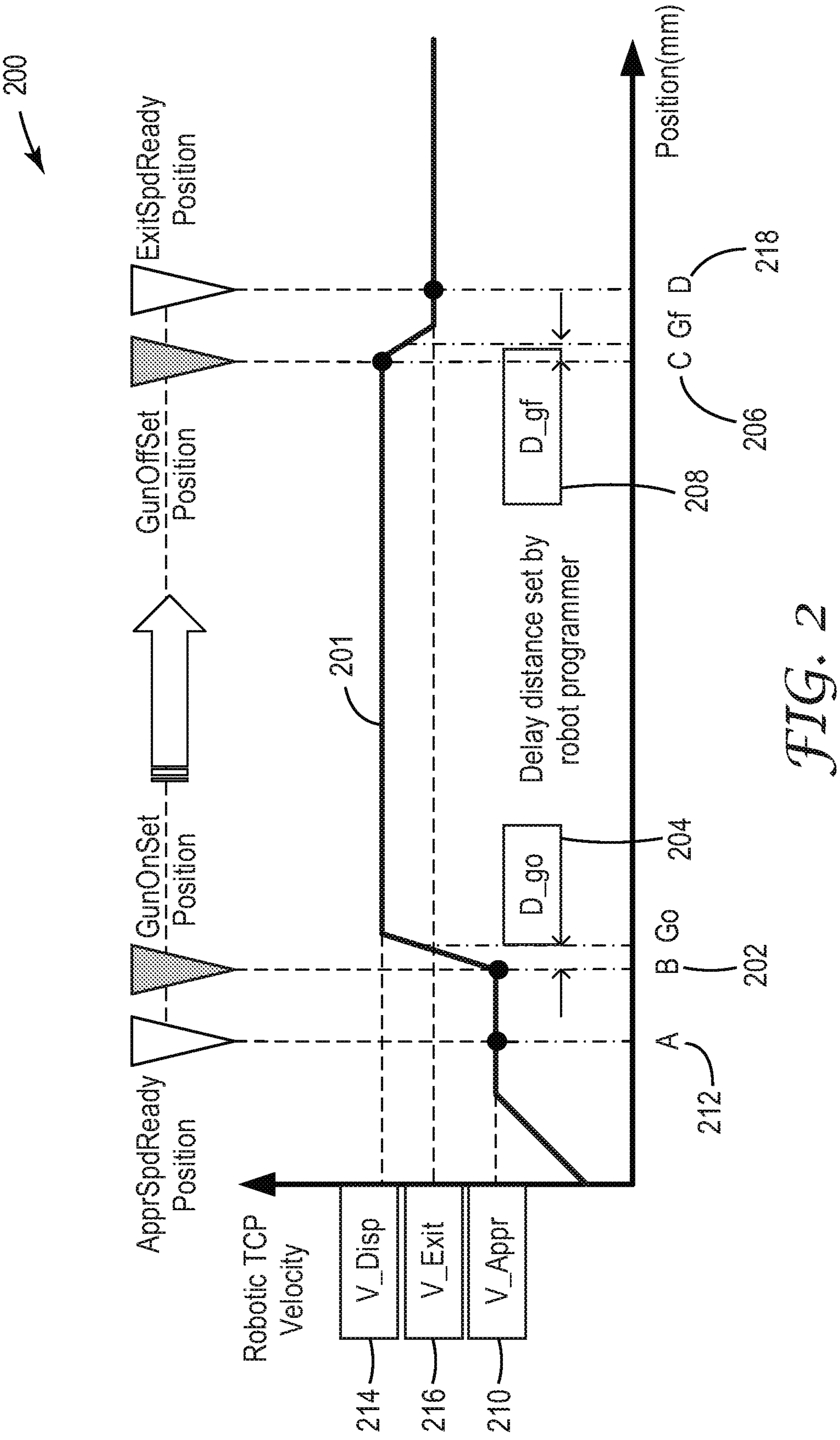
FIG. 2 illustrates parameters of a dispensing process for dispensing adhesive or other liquid.

FIG. 2 illustrates parameters of a dispensing process 200 for dispensing adhesive or other liquid. The x-axis illustrates a position along a substrate where dispensing can terminate and start. The y-axis depicts a velocity of a tool center point (TCP) of a dispensing tool (e.g., dispenser apparatus 100 (FIG. 1)), for purposes of illustrating how an adhesive dispensing tool can speed up or slow down as it begins or terminates adhesive dispensing. Curve 201 illustrates how dispensing can proceed along the substrate with varying TCP speeds.

In some previous solutions, dispensing parameters can be controlled to dynamically control the width, height, and sectional area of adhesive dispensed along a surface of a substrate. For example, a dispenser valve 108 (FIG. 1) can be controlled to open and dispense adhesive at point 202. However, delays can occur depending on pump properties, or other factors, resulting in a time delay 204 before actual liquid is dispensed. This can result in too much adhesive being dispensed at certain points, which can reduce quality of the appearance of the substrate, adhesive, or other aspect of a dispense operation.

Similarly, it may be desired to terminate adhesive dispensing at point 206, but a control time delay 208 can be introduced before dispensing terminates. TCP speed can be controlled to reduce or eliminate some of these delays or to reduce the effect of these delays. However, there can still be a time delay for value 108 to respond to control circuitry commands.

Apparatuses and methods according to embodiments provide for more accurate measurement and representation of adhesive dispensing paths to provide for improved appearance and accuracy of adhesive dispensing.

Apparatuses and Algorithms for Adhesive Dispensing

To account for these and other complexities, apparatuses, and algorithms according to various embodiments provide for more accurate liquid dispensing control based on the geometric parameters of shapes created by the liquid when dispensed on a substrate.

Referring again to FIG. 2, at least three pertinent velocity values of a TCP can be controlled and measured to provide a continuous stream of liquid adhesive onto a substrate to meet aesthetic and other standards. First, the approaching speed 210 describes the motion before the dispensing signal is provided at point 202. At point 212 a fixed distance before point 202, a dispensing signal can be transmitted to the dispenser such that dispense operations can commence a predetermined time before liquid is expected to be applied to the substrate. From point 212 to point 202, the TCP velocity equals approaching speed 210.

The dispensing speed 214, which may be different or the same (or nearly the same) as approaching speed 210, determines the actual velocity of the liquid applying and bead forming process before point 206 where the control circuitry provides a signal to terminate or turn off liquid application and bead forming operations.

The exiting speed 216, defines the speed of the TCP as the dispenser moves away from point 206, or the terminate point of the dispense operation. Point 218 is the point at which liquid terminates exiting the TCP to form liquid beads on the substrate. Point 218 may occur subsequent to point 206 at least somewhat because of time delays of the valve 108 and other dispenser components. In summary, considering there can be a time delay between signal on/off and the dispense valve 108 turning on or off, some drifting distance (B-Go and Gf-C) can occur between open/closed points and the points at which liquid adhesive is applied to a substrate 110 or at which liquid adhesive terminates being applied to the substrate 110. These time drifts can cause points to form within the applied adhesive, according to bead geometry described with respect to FIG. 4A and FIG. 4B below.

Figure 3:
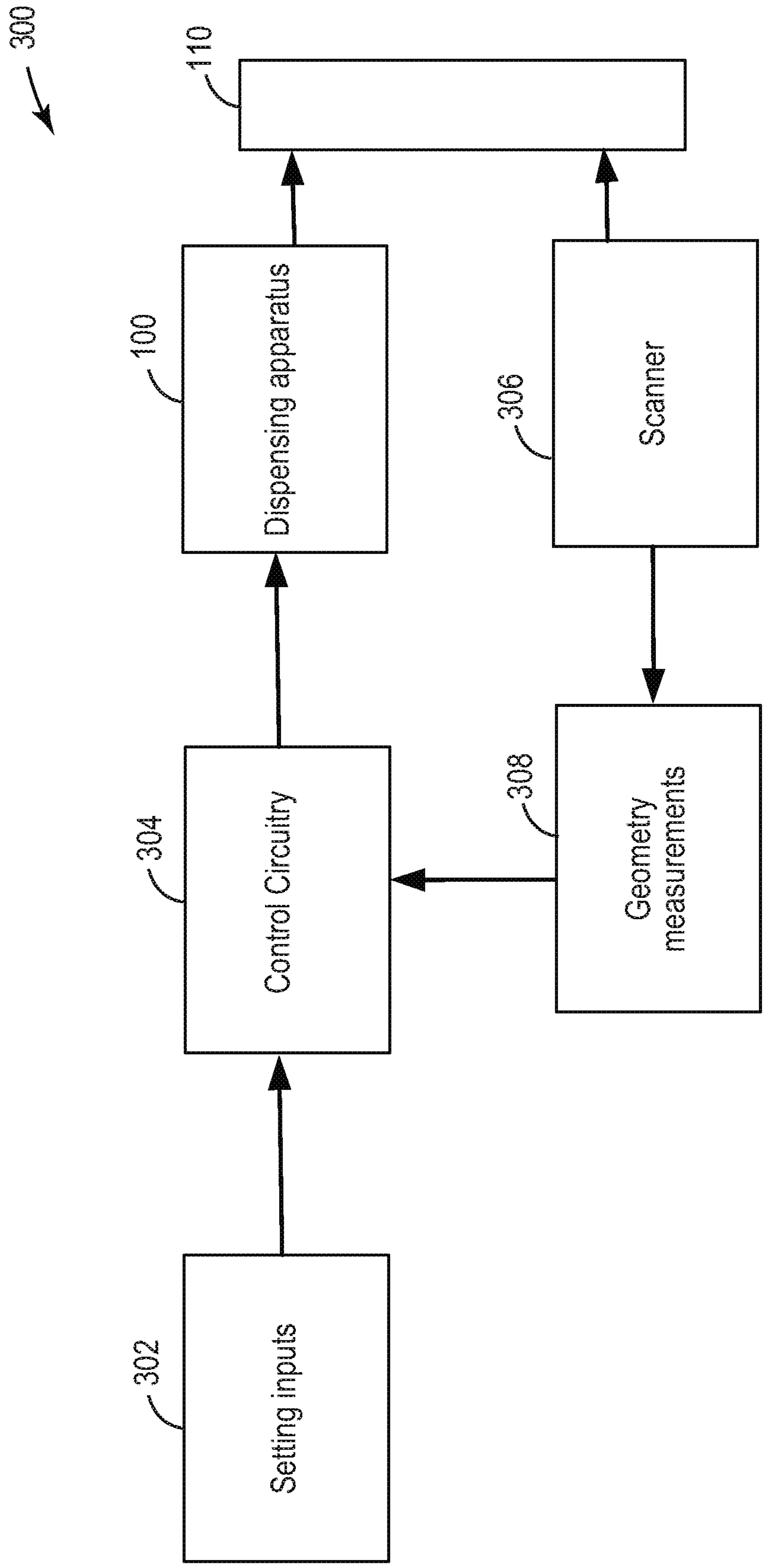
FIG. 3 illustrates a system for controlling parameters of a liquid dispense process in accordance with some embodiments.

FIG. 3 illustrates a system 300 for controlling parameters of a liquid dispense process in accordance with some embodiments. Settings inputs 302 can include pump settings, valve settings, pipe and nozzle settings, environmental parameters such as temperature, and adhesive characteristics such as viscosity, lot number, chemical characteristics, manufacturer information, etc.

Inputs can be provided to control circuitry 304. The control circuitry 304 can provide control signals to control robotics motion, e.g., of components of the dispenser apparatus 100. These or other control signals can control one or more of dispensing speed, dispenser on time, dispenser off time, height of the dispenser orifice over a substrate 110, substrate 110 surface tension and other parameters, etc. The control circuitry 304 can also implement a machine learning algorithm to adjust parameters for subsequent operations according to algorithms described further herein.

Subsequent to liquid being dispensed to the substrate 110, a measurement device 306, which can include a three-dimensional scanner, can inspect substrate 110 to provide geometry data 308 of the dispensed liquid beads that have been dispensed to the substrate 110. Geometry and other information can be linked to the dispenser apparatus 100 by the control circuitry 304 for real-time control of subsequent dispensing operations. Geometric parameters can include, for example, width of bead/s, height of bead/s, and volume of bead/s. Representative geometric parameters are further described with respect to FIG. 4A and FIG. 4B.

Figure 4A:
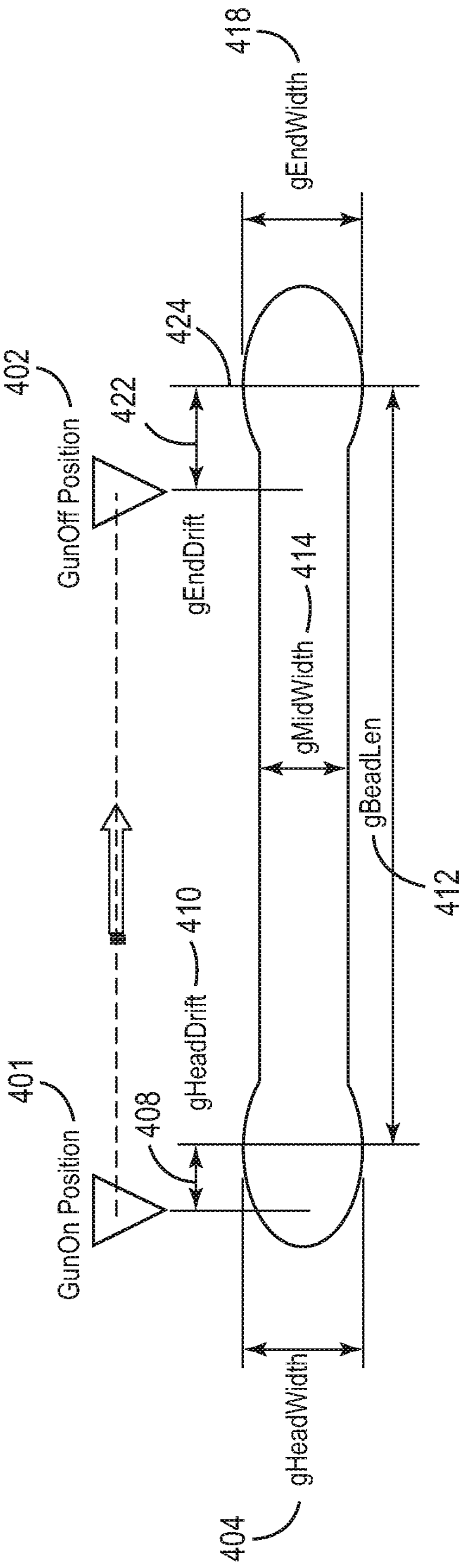
FIG. 4A illustrates width geometric parameters relevant to liquid beads subsequent to dispensing the liquid beads onto a substrate in accordance with some embodiments.

FIG. 4A illustrates width geometric parameters relevant to a liquid bead 400 subsequent to dispensing the liquid bead 400 onto a substrate. A dispensing gun may be "turned on," initiated or enabled at point 401, and "turned off," terminated or disabled at point 402. A liquid head, having a head width 404 and a head height 406, may be present. The liquid head can represent, among other conditions, a delay or drift 408 from point 401 to a head drift point 410 where dispensing physically begins.

Figure 4B:
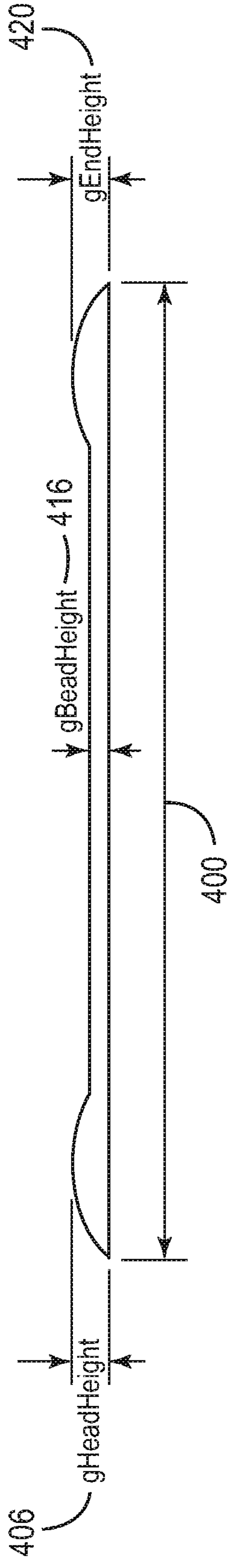
FIG. 4B illustrates height geometric parameters relevant to liquid beads subsequent to dispensing the liquid beads onto a substrate in accordance with some embodiments.

Referring to FIG. 4B, a liquid bead 400 can be dispensed along bead length 412, with bead width 414 and bead height 416. A liquid end, having an end width 418 and end height 420, can be present representing liquid that is dispensed for longer than a preferred time from point 402, or for an end drift distance 422 from point 402 to end drift point 424.

Processing circuitry, for example the control circuitry 304 or another computing system, can generate maps or models correlating actual and expected bead geometric parameters illustrated with respect to FIG. 4A and FIG. 4B to values for the parameters defined with respect to FIG. 3 above. The models, described in more detail below, can be generated by dispensing liquid adhesive at various dispensing velocities under various conditions described with reference to FIG. 3. Using these models or other correlations, dispensing velocity, dispensing position, and other variables can be controlled to provide liquid adhesive in a dispense operation that meets or exceeds aesthetic standards, quality standards and accuracy standards of liquid dispensing operations.

Speed v has a relationship with the width, height, and section area of a dispensed bead, given constant flow rate, according to Relationships (1)-(3):

$$w \propto v^{-2} \quad \text{(Relationship 1)}$$

$$h \propto v^{-2} \quad \text{(Relationship 2)}$$

$$S \propto v^{-1} \quad \text{(Relationship 3)}$$

where w, h, S are bead width, bead height and bead section area respectively.

Next, width parameters are given according to 1.) $W_m$—the average middle width of a bead (e.g., bead width 414); 2.) $W_h$—the maximum head width (e.g., head width 404); and 3.) $W_e$—the maximum end width (e.g., end width 418). Height parameters are given according to 1.) $H_m$—the average middle height (e.g., bead height 416); 2.) $H_h$—the maximum head height (e.g., head height 406); and 3.) $H_e$—the maximum end height (e.g., end height 420 (FIG. 4B).

$D_{go}$ and $D_{gf}$ (e.g., drift 408 and drift 422, respectively) are controlled parameters set or signaled by the control circuitry 304 to program shift distance for the dispenser apparatus 100 gun to turn on and off to compensate adhesives dispensing at the head and end. The controller can determine $D_{go}$ and $D_{gf}$ according to the equations below.

First, given drifting head distance $D_{rh}$ and drifting end distance $D_{re}$ according to Equations (1) and (2) below:

$$D_{rh} = \vec{m} \cdot \vec{b} \| Pos(P_{MaxHead}) - Pos(P_{GunOn}) \| \quad (1)$$

$$D_{re} = \vec{n} \cdot \vec{b} \| Pos(P_{MaxEnd}) - Pos(P_{GunOff}) \| \quad (2)$$

where $\vec{m}$ is the unit vector of $Pos(P_{MaxHead})-Pos(P_{Gunon})$ $\vec{n}$ is the unit vector of $Pos(P_{MaxEnd})-Pos(P_{Gunoff})$, b is the motion vector at the points $P_{MaxHead}$ or $P_{MaxEnd}$ where $P_{MaxHead}$ and $P_{MaxEnd}$ are given by Equations (3) and (4).

$$P_{MaxHead} = (P_{max\,head\,width} + P_{max\,head\,height})/2 \quad (3)$$

$$P_{MaxEnd} = (P_{max\,end\,width} + P_{max\,end\,height})/2 \quad (4)$$

where head width and head height are given by parameters 404 and 406, respectively, as seen in FIG. 4A and FIG. 4B, and end width and end height are given by parameters 418 and 420, respectively, of FIG. 4A and FIG. 4B.

To provide for a consistent section area S along a bead 400 (FIG. 4B), for example to avoid dispensing an excess of liquid, algorithms for dispensing speed $V_{disp}$ (illustrated by, e.g., element 214 (FIG. 2)) or for initial values of $V_{disp}$ can be determined relative to the approaching speed $V_{appr}$ (illustrated by element 210 (FIG. 2)), with which a dispenser apparatus 100 approaches a start point and the speed $V_{exit}$ (illustrated by element 216 (FIG. 2)) with which the dispenser apparatus 100 exits an end point. As an initial value, for example, $V_{disp}$, $V_{appr}$, and $V_{exit}$ can be set equal to each other or to some other predetermined different or same values. Trial dispensing operations can be performed, and geometric values similar or same as those described above can be measured to determine quality and aesthetics of dispensing operations. For example, the control circuitry 304 can execute Equations (1) and (2). Width and height parameters such as $W_m$ (average middle width of a bead (e.g., bead width 414)), $W_h$ (maximum head width (e.g., head width 404)) and $W_e$ (maximum end width (e.g., end width 418)) can be measured by, for example, three-dimensional scanners or other tools such as optical measuring tools. Additionally, height parameters $H_m$ (average middle height (e.g., bead height 416)), $H_h$ (maximum head height (e.g., head height 406)), and $H_e$ (maximum end height (e.g., end height 420 (FIG. 4B)) can also be measured by three-dimensional scanners or other tools such as optical measuring tools.

The control circuitry 304 can then execute Equations (5)-(7) to determine new approach and exit speeds $V_{apprnew}$ and $V_{exitnew}$, respectively, and dispense speeds $V_{disp}$ for use in subsequent trial liquid dispensing operations or other liquid dispensing operations:

$$V_{apprnew} = \begin{cases} \left(\frac{W_h}{W_m}\right)^2 \cdot V_{appr} \cdot k & \text{if only width data available} \\ \frac{1}{2}\left[\left(\frac{W_h}{W_m}\right)^2 + \left(\frac{H_h}{H_m}\right)^2\right] \cdot V_{appr} \cdot k & \text{if both width and height data available} \end{cases} \quad (5)$$

$$V_{exitnew} = \begin{cases} \left(\frac{W_e}{W_m}\right)^2 \cdot V_{exit} \cdot k & \text{if only width data available} \\ \frac{1}{2}\left[\left(\frac{W_e}{W_m}\right)^2 + \left(\frac{H_e}{H_m}\right)^2\right] \cdot V_{exit} \cdot k & \text{if both width and height data available} \end{cases} \quad (6)$$

$$V_{dispnew} = V_{disp} \cdot k \quad (7)$$

where k is the speed multiplier related to actual cycle time and required cycle time, where cycle time relates to the amount of time between the time a control signal is provided to the dispenser apparatus 100 and the time that the dispenser apparatus 100 begins to provide liquid.

As mentioned earlier herein, valve 108 (FIG. 1) can also be associated with delays related to control signaling, valve physical parameters, and other delays and conditions. Accordingly, valve delay compensation values $D_{gonew}$ and $D_{gfnew}$ can be calculated according to Equations (8) and (9) to shift the bead 400 (FIG. 4B) to a desired position for aesthetic and quality considerations:

$$D_{gonew} = D_{go} - D_{rh} \quad (8)$$

$$D_{gfnew} = D_{gf} - D_{re} \quad (9)$$

where $D_{go}$ and $D_{gf}$ can be visualized according to point 401 and point 402 (FIG. 4A), respectively and $D_{rh}$ and $D_{re}$ are given according to Equations (1) and (2), respectively. Actions based on the above equations and measurements can be repeated until uniformity measurements are met or exceeded. For example, referring to FIG. 4A, the width elements 404 and 418 should be brought within a threshold of element 414, for example, within about 10% of element 414, or within about 5% of element 414. Height elements 406 and 420 should similarly be brought within a threshold of element 416, for example, within about 10% of element 416 or within about 5% of element 416.

Cycle time can also be adjusted based on the speed multiplier k. Given a desired cycle time $T_{rc}$ smaller than actual cycle time $T_{ac}$, the speed multiplier can be adjusted according to Equation (10):

$$k = T_{ac}/T_{rc} \tag{10}$$

Example Method

Figure 5:
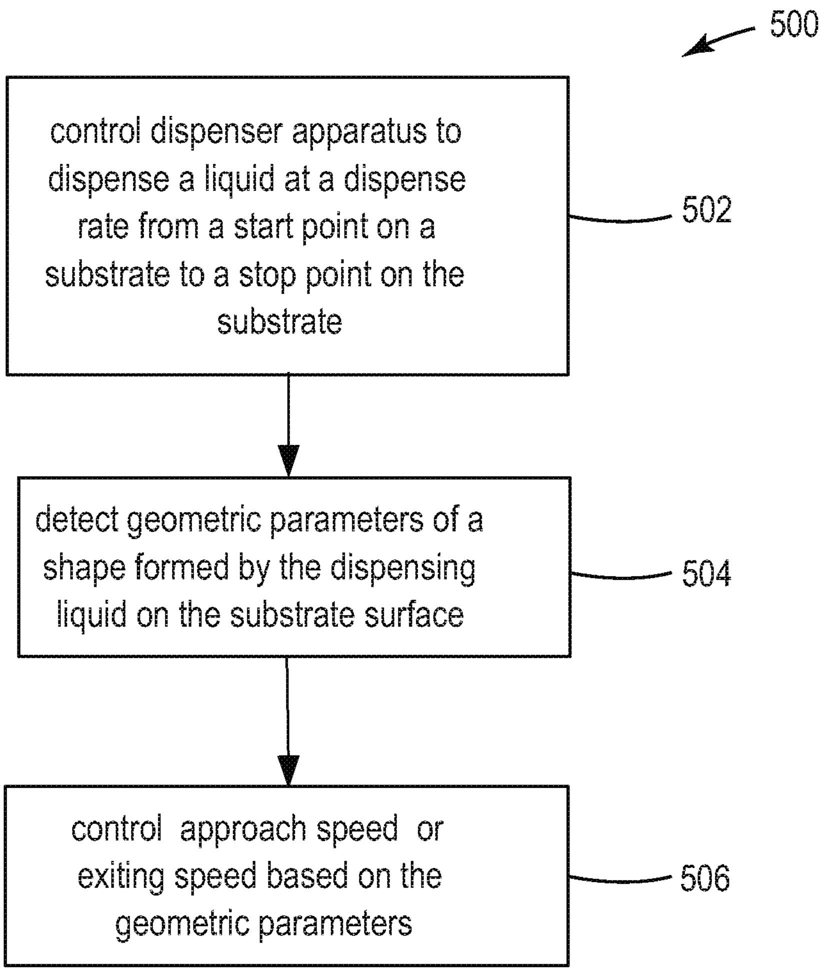
FIG. 5 is a flow chart of a method for dispensing liquid in accordance with some embodiments.

FIG. 5 is a flow chart of a method 500 for predicting an adhesive dispenser pressure in accordance with some embodiments. Operations of method 500 can be performed by, for example, control circuitry 304 (FIG. 3) on which Equations (1)-(10) can be executed and relationships (R1)-(R3) can be analyzed. Other operations can be provided a scanning tool or other measurement device, for example a three-dimensional scanner 306 (FIG. 3). In examples, Equations (1)-(10) can be partially or completely executed using machine learning (ML) and based on inputs automatically generated and provided by sensors, or input by users, among other inputs. For example, ML algorithms may predict future results of executions of Equations (1)-(9) or predict inputs for analyzing Equations (1)-(9) to associate environmental conditions with a statistical likelihood that different dispenser settings will lead to improved bead geometries. These learned dispenser settings can be used for subsequent dispense operations.

The method 500 can begin with operation 502 with the control circuitry 304 controlling a dispenser apparatus 100 to dispense a liquid at a dispense rate from a start point on a substrate 110 surface to a terminate point on the substrate 110 surface.

The method 500 can continue with operation 504 with the measurement device 306 detecting geometric parameters of a shape formed by the dispensing liquid on the substrate surface. The shape can be similar to, for example, shapes depicted in FIG. 4A and FIG. 4B.

The method 500 can continue with operation 506 with the control circuitry 304 controlling at least one of an approach speed $v_{apprnew}$ at which the dispenser apparatus 100 approaches the start point prior to the dispense operation and an exiting speed $v_{exitnew}$ at which the dispenser apparatus 100 moves away from the terminate point subsequent to the dispense operation based on the detected geometric parameters of the shape. The dispense operation can include, for example, dispensing liquid.

The method 500 can further include controlling a dispensing speed $V_{disp}$ at which the dispenser moves over the substrate while dispensing liquid. Further operations can include adjusting the dispensing parameters based on the geometric parameters using, for example, machine learning and other predictive and adjustive methodologies and learning algorithms. A three-dimensional scanner (e.g., measurement device 306) can be operated in some embodiments to detect a shape of a bead of dispensed liquid. Referring to FIG. 4A and FIG. 4B, the geometric parameters can include at least one of bead height 416 of a dispensed bead of liquid, bead width 414 of the dispensed bead of liquid, and bead section area S (Relationship 3) of the dispensed bead of liquid.

In some embodiments, the method can include controlling approach speed $v_{apprnew}$ according to $$v_{apprnew} = \left(\frac{W_h}{W_m}\right)^2 \cdot V_{appr} \cdot k,$$

where k is a speed multiplier that varies based on dispenser cycle time, $W_h$ is maximum head width of the bead of dispensed liquid, and $W_m$ is an average middle width of the bead of dispensed liquid. If bead height measurements are available, the method can include controlling approach speed $v_{apprnew}$ according to $$v_{apprnew} = \frac{1}{2}\left[\left(\frac{W_h}{W_m}\right)^2 + \left(\frac{H_h}{H_m}\right)^2\right] \cdot V_{appr} \cdot k,$$

where k is a speed multiplier that varies based on dispenser cycle time, $W_h$ is maximum head width of the bead of dispensed liquid, $W_m$ is an average middle width of the bead of dispensed liquid, $H_h$ is a maximum head height of the bead of dispensed liquid, and $H_m$ is an average middle height of the bead of dispensed liquid.

In some embodiments, the method 500 can include controlling exiting speed $v_{exitnew}$ according to $$v_{exitnew} = \left(\frac{W_e}{W_m}\right)^2 \cdot V_{exit} \cdot k,$$

where k is a speed multiplier that varies based on dispenser cycle time, $W_e$ is maximum end width of the bead of dispensed liquid, and $W_m$ is an average middle width of the bead of dispensed liquid. When height measurements are available, the method 500 can include controlling exiting speed $v_{exitnew}$ according to $$v_{exitnew} = \frac{1}{2}\left[\left(\frac{W_e}{W_m}\right)^2 + \left(\frac{H_e}{H_m}\right)^2\right] \cdot V_{exit} \cdot k,$$

where k is a speed multiplier that varies based on dispenser cycle time, $W_e$ is maximum end width of the bead of dispensed liquid, $W_m$ is an average middle width of the bead of dispensed liquid, $H_e$ is a maximum end height of the bead of dispensed liquid, and $H_m$ is an average middle height of the bead of dispensed liquid.

The method 500 can further include adjusting dispense "on" time according to a valve delay value. The method 500 can further include storing data related to one or more of a dispenser configuration, liquid properties, and substrate dimensions. The dispenser configuration can include one or more of pump settings, valve settings, pipe settings, and nozzle settings. The method 500 can further comprise the control circuitry 304 retrieving data from memory and controlling dispense operations based on the data retrieved from memory. The method 500 can further include adjusting control based on one or more of an environmental factor and a liquid property.

Figure 6A:
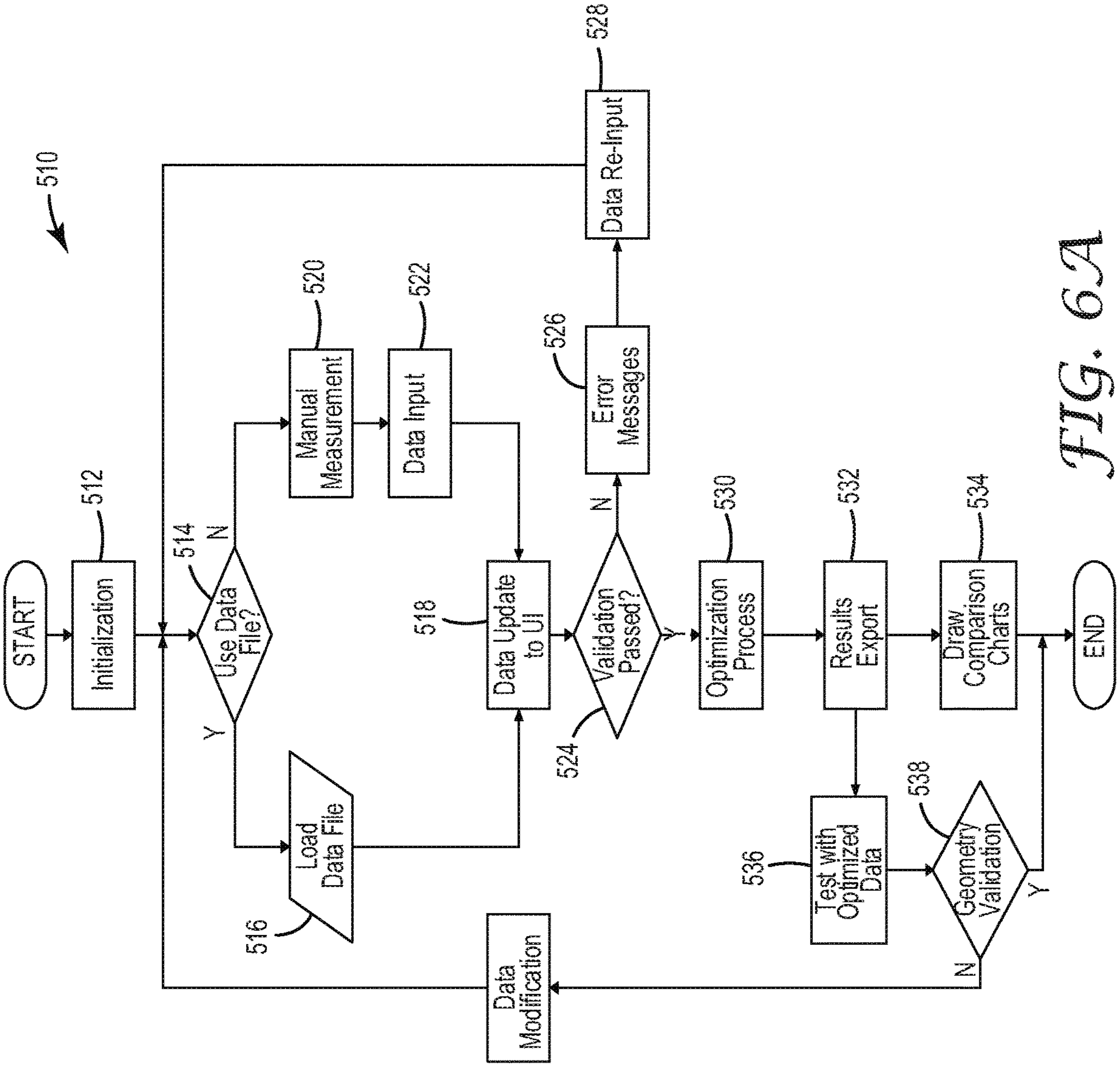
FIG. 6A is a flow chart of a workflow for bead geometry robotics control in accordance with some embodiments.

FIG. 6A is a flow chart of a workflow 510 for bead geometry robotics control in accordance with some embodiments. Operations of method 500 can be performed by, for example, control circuitry 304 (FIG. 3) on which Equations (1)-(10) can be executed and relationships (R1)-(R3) can be analyzed. In operation 512, values for various parameters such as width- and height-related parameters, can be initialized, for example to zero or to some a historically relevant value. In operation 514, the control circuitry 304 can determine whether to read measurements from a data file. If the control circuitry 304 determines to read from a data file, in operation 516, the control circuitry 304 reads various parameters form the data file in operation 516 and provides the parameters to various user interface elements in operation 518. Otherwise, the control circuitry 304 retrieves measurements, for example manual measurements in operation 520 and provides them as data input 522 to the user interface in operation 518.

In operation 524, the control circuitry 304 can perform validation for clearly erroneous values (for example, negative numbers entered as width or height, or numbers much larger or smaller than physically possible given manufacturing restraints). If clearly erroneous data is detected in operation 524, the control circuitry can generate error messages in operation 526 and request re-input of data in operation 528, at which point operations will resume at operation 514. Otherwise, optimization processes will be executed according to FIG. 5 above, in operation 530. Results can be exported in operation 532, for example to a data file or to the user interface. In some examples, charts can be drawn in operation 534, as illustrated below in FIG. 6B and FIG. 6C. In operation 536, the control circuitry 304 can test subsequent liquid dispense operations to validate geometry at block 538. If further optimizations or executions of workflow 510 are needed, the control circuitry 304 can resume operations at operation 514. Otherwise, operations are terminated.

Figure 6B:
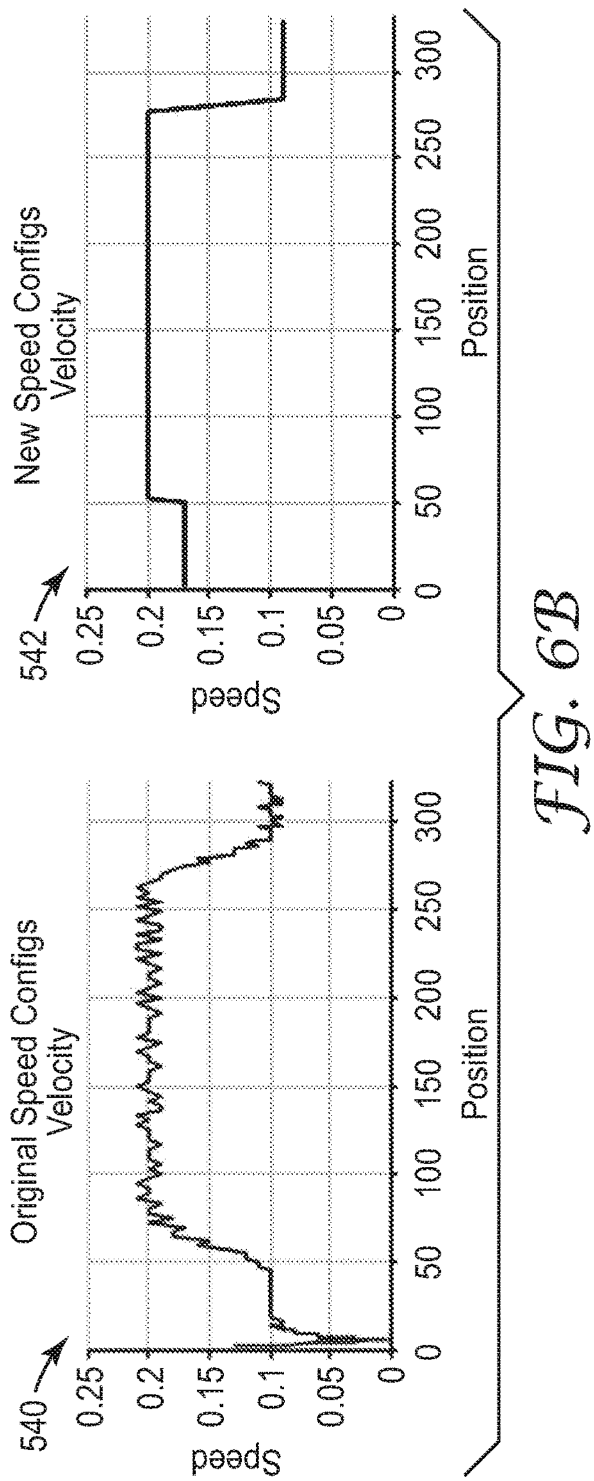
FIG. 6B illustrates speed configuration improvement as can be realized using methods and apparatuses in accordance with embodiments.

FIG. 6B illustrates speed configuration improvement as can be realized using methods and apparatuses in accordance with embodiments. Graph 540 illustrates dispenser speed versus position in available liquid dispensing systems, while graph 542 illustrates dispenser speed versus position using apparatuses, systems, and methods in accordance with various embodiments. It is noted that "jitter" is reduced, which can provide a more aesthetically-pleasing dispense on the substrate.

Figure 6C:
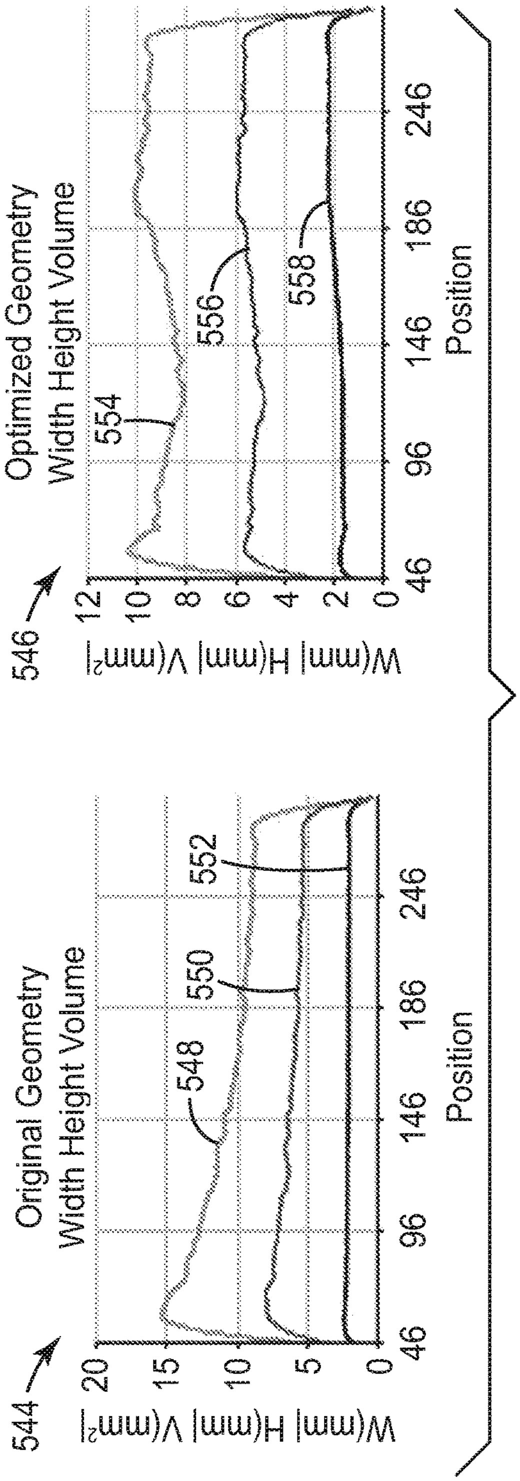
FIG. 6C illustrates geometry improvements as can be realized using methods and apparatuses in accordance with embodiments.

FIG. 6C illustrates geometry improvements as can be realized using methods and apparatuses in accordance with embodiments. Graph 544 illustrates geometries in available liquid dispensing systems, while graph 546 illustrates dispenser speed versus position using apparatuses, systems, and methods in accordance with various embodiments. Curve 548 illustrates volume, curve 550 illustrates width, and curve 552 illustrates height of dispensed beads versus position using available systems. Curve 554 illustrates volume, curve 556 illustrates width, and curve 558 illustrates height of dispensed beads versus position using apparatuses and methods in accordance with some embodiments. Curves 554, 556 and 558 are flatter than curves 548, 550 and 552, showing improved geometries and more consistent bead dispensing.

Computer Apparatuses

Figure 7:
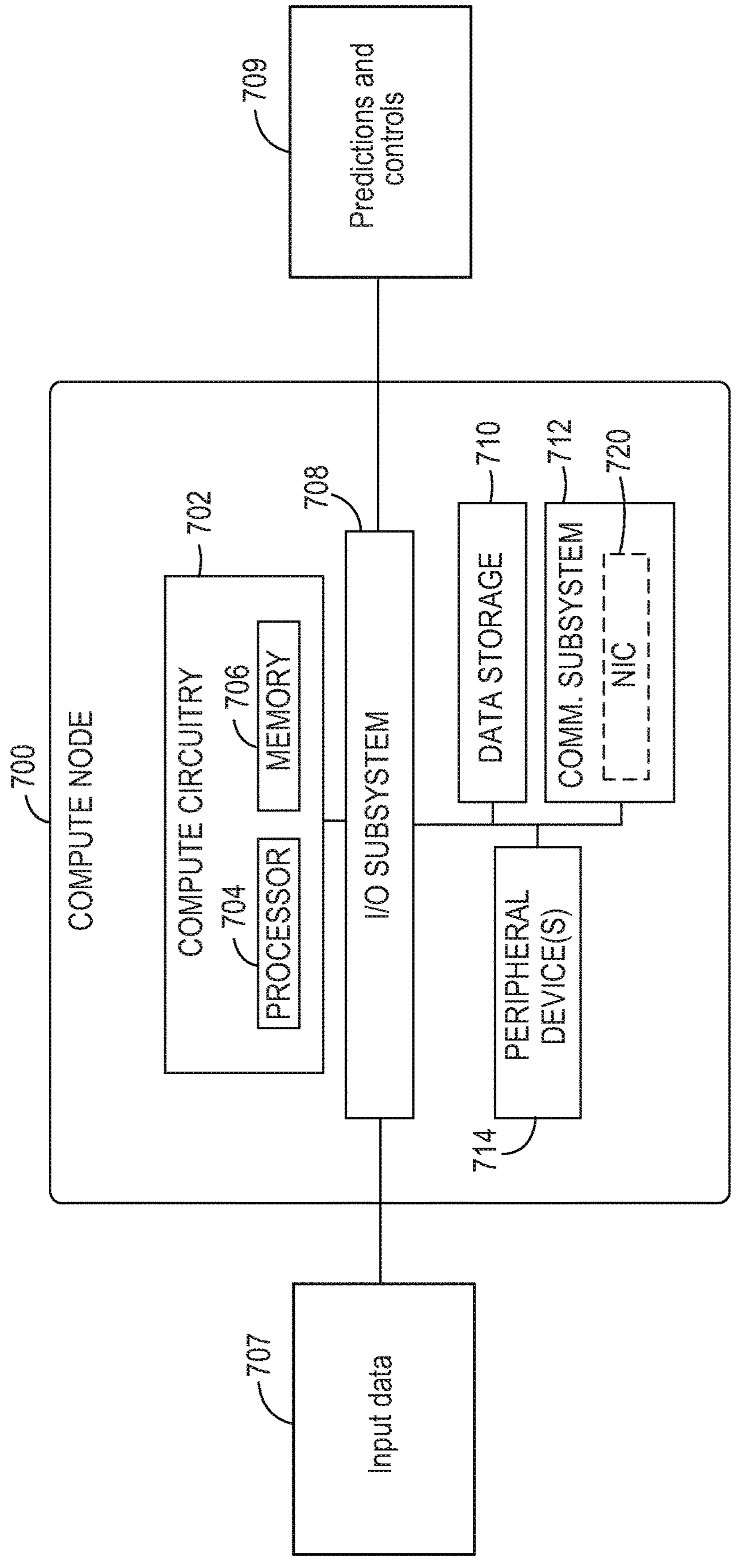
FIG. 7 depicts a computing node in accordance with some embodiments.

Systems, methods, and apparatuses can implement embodiments using processors, in firmware or software, remotely or locally to the operator processes, or in the cloud or edge computing device, as will be described in more detail later herein. Machine learning and other control operations can be distributed among several different devices and implemented completely or partially within the adhesive dispensing device itself. For example, some identification processes can be performed by the adhesive dispenser apparatus 100 (FIG. 1), and inputs therefrom can be provided to local or remote devices to formulate predictions regarding dispenser settings. Accordingly, the apparatuses and circuitry of the adhesive dispenser apparatus 100, control circuitry 304, (FIG. 3), and other components, can be executed or partially executed on computing systems, for example edge computing nodes. FIG. 7 depicts an edge computing node in accordance with some embodiments.

Figure 8:
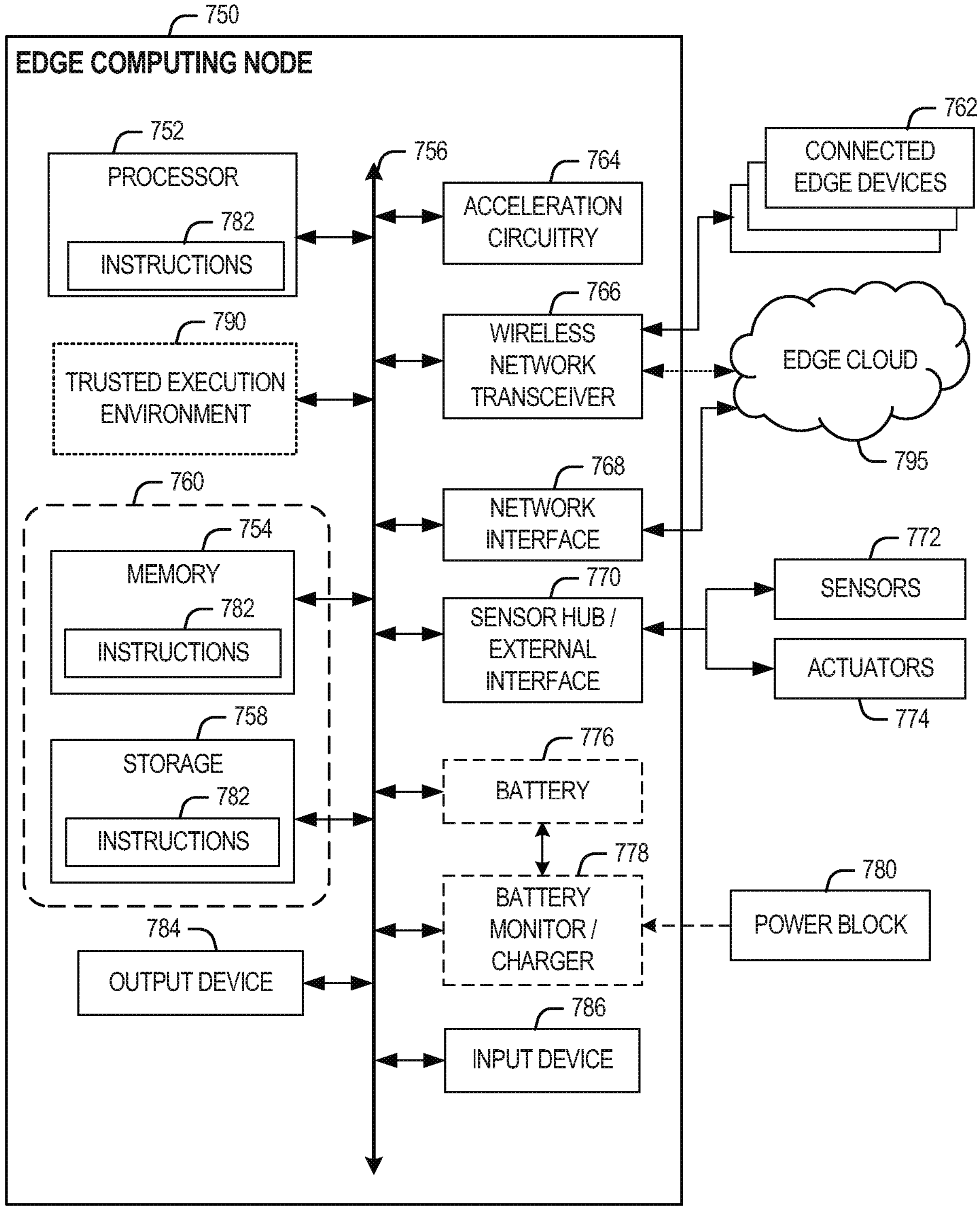
FIG. 8 depicts further details on edge computing node in accordance with some embodiments.

In the simplified example depicted in FIG. 8, an edge compute node 700 (e.g., apparatus) includes a compute engine (also referred to herein as "compute circuitry") 702, an input/output (I/O) subsystem 708, data storage device 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, or other processor or processing/controlling circuit. In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

The memory 706 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In an example, the memory device is a block addressable memory device, such as those based on NAND or NOR technologies. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry or components to facilitate input/output operations with the compute circuitry 702 (e.g., with the processor 704 or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702. The I/O subsystem 708 can receive input data 707 from other components of FIG. 3, for example, measurement device 306, etc. and provide predictions and controls 709 to other components of FIG. 3.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN), ultra-wide-band or low-power wide-area (LPWA) protocols, etc.) to effect such communication.

The illustrative communication circuitry 712 includes a network interface controller (NIC) 720. The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors or included on a multichip package that also contains one or more processors. In some examples, the NIC 720 may include a local processor (not shown) or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

In a more detailed example, FIG. 8 illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a computer, a mobile device, a server, a smart sensor, a control system, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing node 750 may include processing circuitry in the form of a processor 752, which may be a microprocessor, a multi-core processor, a multithreaded processor, an ultra-low voltage processor, an embedded processor, or other known processing elements. The processor 752 may be a part of a system on a chip (SoC) in which the processor 752 and other components are formed into a single integrated circuit, or a single package. The processor 752 and accompanying circuitry may be provided in a single socket form factor, multiple socket form factor, or a variety of other formats, including in limited hardware configurations or configurations that include fewer than all elements shown in FIG. 8.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, extreme Digital (XD) picture cards, and the like, and Universal Serial Bus (USB) flash drives.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, proprietary busses, and a power bus, among others.

The interconnect 756 may couple the processor 752 to a transceiver 766, for communications with the connected edge devices 762. The connected edge devices 762 can include other elements or portions of other elements depicted in FIG. 8, or other elements of manufacturing systems in use by the operator, either remotely or locally to tape automation systems. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network. Ultra-wideband sensors and emitters may be used to facilitate precise positioning of tape relative to defined emitter beacons, as well as communications such as data transfer.

Given the variety of types of applicable communications from the device to another component or network, applicable communications circuitry used by the device may include or be embodied by any one or more of components 764, 766, 768 or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of data processing units (DPUs) or Infrastructure Processing Units (IPUs), one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors or gauges, global navigation system (e.g., GPS) sensors, pressure sensors, barometric pressure sensors, any sensors for detecting conditions of tapes or other adhesives, primers, substrates, and the like. These sensors may be directly connected to the computing device or remotely located as part of various manufacturing modules. The hub or interface 770 further may be used to connect the edge computing node 750 to actuators 774, such as power switches, valve actuators, an audible sound generator, a visual warning device, and the like. These actuators may be directly connected to the computing device or remotely located as part of various manufacturing modules.

In some optional examples, various input/output (I/O) devices may be present within or connected to, the edge computing node 750. For example, a display or other output device 784 may be included to show information, such as sensor readings or actuator position. An input device 886786 such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases. These various input/output devices may be directly connected to the computing device or remotely located as part of various manufacturing modules. In examples, notifications can be provided to more than one device simultaneously, for example, a user can view notifications on individual modules of the illustrated in example systems. Simultaneously or near simultaneously, based proximity or other criteria, notifications can be provided to the user's smartphone or other device such as a tablet or computer, or to a stand-alone device or a device separate from user's personal equipment.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium-ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. The specific charging circuits may be selected based on the size of the battery 776, and thus, the current required.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also, in a specific example, the instructions 782 on the processor 752 (separately, or in combination with the instructions 782 of the machine readable medium 760) may configure execution or operation of a trusted execution environment (TEE) 890. In an example, the TEE 890 operates as a protected area accessible to the processor 752 for secure execution of instructions and secure access to data.

In further examples, a machine-readable medium also includes any tangible medium that is capable of storing, encoding, or carrying instructions for execution by a machine and that cause the machine to perform any one or more of the methodologies of the present disclosure or that is capable of storing, encoding, or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include compiling (e.g., from source code, object code, etc.), interpreting, loading, organizing (e.g., dynamically, or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Adhesives

Generally, structural adhesives may be divided into two broad categories: one-part adhesives and two-part adhesives. With a one-part adhesive, a single composition comprises all the materials necessary to obtain a final cured adhesive. Such adhesives are typically applied to the substrates to be bonded and exposed to elevated temperatures (e.g., temperatures greater than 50° C.) to cure the adhesive. In contrast, two-part adhesives comprise two components. The first component, typically referred to as the "base resin component," comprises the curable resin. The second component, typically referred to as the "accelerator component," comprises the curing agent(s) and catalysts. Various other additives may be included in one or both components.

Other adhesives used herein can include hot melt adhesives, for example one-component, moisture-curing hot melt adhesives. This product group is characterized by a very high heat resistance compared to classic, thermoplastic PO hot melts. In some examples, polyurethane (PUR) hot melts that contain isocyanates for the chemical crosslinking process are used. In other examples, polyolefin (POR) hot melts that use silanes as the reactive component are used herein. Two component adhesives are 100% solids systems that obtain their storage stability by separating the reactive components. They are supplied as "resin" and "hardener" in separate containers. It is important to maintain the prescribed ratio of the resin and hardener to obtain the desired cure and physical properties of the adhesive. The two components are only mixed to form the adhesive a short time before application with cure occurring at room temperature. Since the reaction typically begins immediately upon mixing the two components, the viscosity of the mixed adhesive increases with time until the adhesive can no longer be applied to the substrate or bond strength is decreased due to diminished wetting of the substrate. Formulations are available with a variety of cure speeds providing various working times (worklife) after mixing and rates of strength build-up after bonding. Final strength is reached in minutes to weeks after bonding depending on the formulation. Adhesive must be cleaned from mixing and application equipment before cure has progressed to the point where the adhesive is no longer soluble. Depending on work life, two component adhesives can be applied by trowel, bead or ribbon, spray, or roller. Assemblies are usually fixtured until sufficient strength is obtained to allow further processing. If faster rate of cure (strength build-up) is desired, heat can be used to accelerate the cure. This is particularly useful when parts need to be processed more quickly after bonding or additional work life is needed but a slower rate of strength build-up cannot be accommodated. When cured, two component adhesives are typically tough and rigid with good temperature and chemical resistance.

Two component adhesives can be mixed and applied by hand for small applications. However, this requires considerable care to ensure proper ratio of the components and sufficient mixing to insure proper cure and performance. There is usually considerable waste involved in hand mixing as well. As a result, adhesive suppliers have developed packaging that allows the components to remain separate for storage and provides a means for dispensing mixed adhesive, e.g., side-by-side syringes, concentric cartridges. The package is typically inserted into an applicator handle and the adhesive is dispensed through a disposable mixing nozzle. The proper ratio of components is maintained by virtue of the design of the package and proper mixing is insured by use of the mixing nozzle. Adhesive can be dispensed from these packages multiple times provided the time between uses does not exceed the worklife of the adhesive. If the work life is exceeded, a new mixing nozzle must be used. For larger applications, meter-mix equipment is available to meter, mix, and dispense adhesive packaged in containers ranging from quarts to drums.

Two-part adhesives consist of a resin and a hardener component which cure once the two components are mixed. They remain stable in storage if the two components are separate from each other. Two-part adhesives are typically designed to be dispensed in a set ratio to gain the desired properties from the specifically formulated adhesive; common ratios include, 10:1, 1:1, 2:1 and so on. The reaction between the two components normally begins immediately once they are mixed and the viscosity increases until they are no longer usable. This can be described as work life, open time, and pot life, as discussed above. Once cured, two component adhesives are tough and rigid with good temperature and chemical resistance.

Epoxy Adhesives

As described earlier herein, epoxy adhesives of example embodiments can include one-part and two-part adhesives. One-part epoxy adhesives can include a resin. Like their one-part cousins, two-part epoxies are also formulated from epoxy resins. Two-part epoxies are widely used in structural applications and are used to bond many materials including, for example: metal, plastic, fiber reinforced plastics (FRP), glass and some rubbers. They are generally fast to cure and provide a relatively rigid bond. Some compositions can often be brittle although toughening agents and elastomers can be utilized to reduce this tendency.

Two-part structural epoxy adhesives are made up of a Resin (Part A or Part 1) and Hardener (Part B or Part 2). An accelerator or chemical catalyst can speed up the reaction between the resin and hardener.

A two-part epoxy can cure at room temperature, so heat is not necessarily required when using one. Two-part epoxies generally achieve handling strength anywhere between five minutes and eight hours after mixing, depending on the curing agents. A chemical catalyst or heat can be applied to speed the reaction between the resin and hardener.

The resin that is the basis for all epoxy is the diglycidyl ether of bisphenol A (DGEBA). Bisphenol A is produced by reacting phenol with acetone under suitable conditions. The "A" stands for acetone, "phenyl" means phenol groups and "bis" means two. Thus, bisphenol A is the product made from chemically combining two phenols with one acetone. Unreacted acetone and phenol are stripped from the bisphenol A, which is then reacted with a material called epichlorohydrin. This reaction sticks the two ("di") glycidyl groups on ends of the bisphenol A molecule. The resultant product is the diglycidyl ether of bisphenol A, or the basic epoxy resin. It is these glycidyl groups that react with the amine hydrogen atoms on hardeners to produce the cured epoxy resin. Unmodified liquid epoxy resin is very viscous and unsuitable for most uses except as a very thick glue.

Chemical raw materials used to manufacture curing agents, or hardeners, for room-temperature cured epoxy resins are most commonly polyamines. They are organic molecules containing two or more amine groups. Amine groups are not unlike ammonia in structure except that they are attached to organic molecules. Like ammonia, amines are strongly alkaline. Because of this similarity, epoxy resin hardeners often have an ammonia-like odor, most notable in the air space in containers right after they are opened. Epoxy hardeners are commonly referred to as "Part B".

Reactive amine groups are nitrogen atoms with one or two hydrogen atoms attached to the nitrogen. These hydrogen atoms react with oxygen atoms from glycidyl groups on the epoxy to form the cured resin—a highly crosslinked thermoset plastic. Heat will soften, but not melt, a cured epoxy. The three-dimensional structure gives the cured resin excellent physical properties.

The ratio of the glycidyl oxygens to the amine hydrogens, considering the various molecular weights and densities involved, determines the final resin to hardener ratio. The proper ratio produces a "fully-crosslinked" thermoset plastic. Varying the recommended ratio will leave either unreacted oxygen or hydrogen atoms depending upon which is in excess. The resultant cured resin will have lower strength, as it is not as completely crosslinked. Excess Part B results in an increase in moisture sensitivity in the cured epoxy and generally should be avoided.

Amine hardeners are not "catalysts". Catalysts promote reactions but do not chemically become a part of the finished product. Amine hardeners mate with the epoxy resin, greatly contributing to the ultimate properties of the cured system. Cure time of an epoxy system is dependent upon the reactivity of the amine hydrogen atoms. While the attached organic molecule takes no direct part in the chemical reaction, it does influence how readily the amine hydrogen atoms leave the nitrogen and react with the glycidyl oxygen atom. Thus, cure time is set by the kinetics of the particular amine used in the hardener. Cure time for any given epoxy system can only be altered by adding an accelerator in systems that can accommodate one, or by changing the temperature and mass of the resin/hardener mix. Adding more hardener will not "speed things up" and adding less will not "slow things down."

The epoxy curing reaction is exothermic. The rate at which an epoxy resin cures is dependent upon the curing temperature. The warmer it is the faster it goes. The cure rate will vary by about half or double with each 18° F. (10° C.) change in temperature. For example, if an epoxy system takes 3 hours to become tack free at 70° F. (about 21.1° C.), it will be tack free in 1.5 hours at 88° F. (about 31.1° C.) or tack free in 6 hours at 52° F. (about 11.1° C.). Everything to do with the speed of the reaction follows this general rule. Pot life and working time are greatly influenced by the initial temperature of the mixed resin and hardener. On a hot day for example, the two materials can be cooled before mixing to increase the working time.

The gel time of the resin is the time it takes for a given mass held in a compact volume to solidify. Gel time depends on the initial temperature of the mass and follows the above rule. One hundred grams (about three fluid ounces) of Silver Tip Laminating Epoxy with Fast Hardener (as an illustrative example) will solidify in 25 minutes starting at 77° F. (about 25° C.); at 60° F. (about 15.6° C.) the gel time is about 50 minutes. If the same mass were spread over 4 square feet at 77° F. (about 25° C.) the gel time would be a little over three hours. Cure time is surface area/mass sensitive in addition to being temperature sensitive.

As the reaction proceeds it gives off heat. If the heat generated is immediately dissipated to the environment (as occurs in thin films) the temperature of the curing resin does not rise and the reaction speed proceeds at a uniform pace. If the resin is confined (as in a mixing pot) the exothermic reaction raises the temperature of the mixture, accelerating the reaction.

Working time or Work Life (WL) of an epoxy formulation is about 75% of the gel time for the geometry of the pot. It can be lengthened by increasing the surface area, working with a smaller mass, or cooling the resin and hardener prior to mixing. Material left in the pot will increase in absolute viscosity (measured at 75° F., or about 23.9° C., for example) due to polymerization but initially decrease in apparent viscosity due to heating. Material left in the pot to 75% of gel time may appear quite thin (due to heating) but will be quite thick when cooled to room temperature. Experienced users either mix batches that will be applied almost immediately or increase the surface area to slow the reaction.

Although the cure rate of an epoxy is dependent upon temperature, the curing mechanism is independent of temperature. The reaction proceeds most quickly in the liquid state. As the cure proceeds, the system changes from a liquid to a sticky, viscous, soft gel. After gelation the reaction speed slows down as hardness increases. Chemical reactions proceed more slowly in the solid state. From the soft sticky gel the system gets harder, slowly losing its stickiness. It becomes tack free and continues to become harder and stronger as time passes.

At normal temperatures, the system will reach about 60 to 80% of ultimate strength after 24 hours. Curing then proceeds slowly over the next several weeks, finally reaching a point where no further curing will occur without a significant increase in temperature. However, for most purposes room temperature cured systems can be considered fully cured after 72 hours at 77° F. (about 25° C.). High modulus systems like Phase Two epoxy, for example, must be post-cured at elevated temperatures to reach full cure.

It is usually more efficient to work with as fast a cure time as practical for the application at hand if the particular system being used offers this choice. This allows the user to move along to the next phase without wasting time waiting for the epoxy to cure. Faster curing films with shorter tack times will have less chance to pick up fly tracks, bugs, and other airborne contaminants.

Epoxy resin compositions generally comprise a first liquid part comprising an epoxy resin and a second liquid part comprising a curing agent. Although the first and second part are liquids at ambient temperature, the liquid parts can comprise solid components dissolved or dispersed within the liquid.

The first part of the two-part composition comprises at least one epoxy resin. Epoxy resins are low molecular weight monomers or higher molecular weight polymers which typically contain at least two epoxide groups. An epoxide group is a cyclic ether with three ring atoms, also sometimes referred to as a glycidyl or oxirane group. Epoxy resins are typically liquids at ambient temperature.

Various epoxy resins are known including for example a bisphenol A type epoxy resin, a bisphenol F type epoxy resin, a bisphenol S type epoxy resin, a phenol novolac type epoxy resin, an alkyl phenol novolac type epoxy resin, a cresol novolac type epoxy resin, a biphenyl type epoxy resin, an aralkyl type epoxy resin, a cyclopentadiene type epoxy resin, a naphthalene type epoxy resin, a naphthol type epoxy resin, an epoxy resin of condensate of phenol and aromatic aldehyde having a phenolic hydroxy group, a biphenyl aralkyl type epoxy resin, a fluorene type epoxy resin, a Xanthene type epoxy resin, a triglycidyl isocyanurate, a rubber modified epoxy resin, a phosphorous based epoxy resin, and the like.

Blends of various epoxy-containing materials can also be utilized. Suitable blends can include two or more weight average molecular weight distributions of epoxy-containing compounds such as low molecular weight epoxides (e.g., having a weight average molecular weight below 200 g/mole), intermediate molecular weight epoxides (e.g., having a weight average molecular weight in the range of about 200 to 1000 g/mole), and higher molecular weight epoxides (e.g., having a weight average molecular weight above about 1000 g/mole). Alternatively, or additionally, the epoxy resin can contain a blend of epoxy-containing materials having different chemical natures such as aliphatic and aromatic or different functionalities such as polar and nonpolar.

In one embodiment, the first part of the two-part composition comprises at least one bisphenol (e.g., A) epoxy resin. Bisphenol (e.g., A) epoxy resins are formed from reacting epichlorohydrin with bisphenol A to form diglycidyl ethers of bisphenol A. The simplest resin of this class is formed from reacting two moles of epichlorohydrin with one mole of bisphenol A to form the bisphenol A diglycidyl ether (commonly abbreviated to DGEBA or BADGE). DGEBA resins are transparent colorless-to-pale-yellow liquids at ambient temperature, with viscosity typically in the range of 5-15 Pas at 25° C. Industrial grades normally contain some distribution of molecular weight, since pure DGEBA shows a strong tendency to form a crystalline solid upon storage at ambient temperature. This same reaction can be conducted with other bisphenols, such as bisphenol F. The choice of the epoxy resin used depends upon the end use for which it is intended. Epoxides with flexibilized backbones may be desired where a greater amount of ductility is needed in the bond line. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Aromatic epoxy resins can also be prepared by reaction of aromatic alcohols such as biphenyl diols and triphenyl diols and triols with epichlorohydrin. Such aromatic biphenyl and triphenyl epoxy resins are not bisphenol epoxy resins.

There are two primary types of aliphatic epoxy resins, i.e., glycidyl epoxy resins and cycloaliphatic epoxides. Glycidyl epoxy resins are typically formed by the reaction of epichlorohydrin with aliphatic alcohols or polyols to give glycidyl ethers or aliphatic carboxylic acids to give glycidyl esters. The resulting resins may be monofunctional (e.g., dodecanol glycidyl ether), difunctional (diglycidyl ester of hexahydrophthalic acid), or higher functionality (e.g., trimethylolpropane triglycidyl ether). Cycloaliphatic epoxides contain one or more cycloaliphatic rings in the molecule to which the oxirane ring is fused (e.g., 3,4-epoxycyclohexylmethyl-3,4-epoxycyclohexane carboxylate). They are formed by the reaction of cyclo-olefins with a peracid, such as peracetic acid. These aliphatic epoxy resins typically display low viscosity at ambient temperature (10-200 mPa·s) and are often used as reactive diluents. As such, they are employed to modify (reduce) the viscosity of other epoxy resins. This has led to the term 'modified epoxy resin' to denote those containing viscosity-lowering reactive diluents. In some embodiments, the resin composition may further comprise a reactive diluent. Examples of reactive diluents include diglycidyl ether of 1, 4 butanediol, diglycidyl ether of cyclohexane dimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N',N',-tetraglycidyl meta-xylylene diamine, and vegetable oil polyglycidyl ether. The resin composition may comprise at least 1, 2, 3, 4, or 5 wt.-% and typically no greater than 15 or 20 wt-% of such reactive diluent(s).

In some embodiments, the resin composition comprises (e.g., bisphenol A) epoxy resin in an amount of at least about 50 wt.-% of the total resin composition including the mixture of boron nitride particles and cellulose nanocrystals. In some embodiments, the amount of (e.g., bisphenol A) epoxy resin is no greater than 95, 90, 80, 85, 80, 75, 70, or 65 wt.-% of the total resin composition.

Epoxies are typically cured with stoichiometric or near-stoichiometric quantities of curative. In the case of two-part epoxy compositions, the second part comprises the curative, also referred to herein as the curing agent. The equivalent weight or epoxide number is used to calculate the amount of co-reactant (hardener) to use when curing epoxy resins. The epoxide number is the number of epoxide equivalents in 1 kg of resin (eq/kg); whereas the equivalent weight is the weight in grams of resin containing 1 mole equivalent of epoxide (g/mol). Equivalent weight (g/mol)=1000/epoxide number (eq/kg).

Common classes of curatives for epoxy resins include amines, amides, ureas, imidazoles, and thiols. In typical embodiments, the curing agent comprises reactive-NH groups or reactive —$NR^1R^2$ groups wherein $R^1$ and $R^2$ are independently H or $C_1$ to $C_4$ alkyl, and most typically H or methyl.

The curing agent is typically highly reactive with the epoxide groups at ambient temperature. Such curing agents are typically a liquid at ambient temperature. However, the first curing agent can also be a solid provided it has an activation temperature at or below ambient temperature.

One class of curing agents are primary, secondary, and tertiary polyamines. The polyamine curing agent may be straight-chain, branched, or cyclic. In some favored embodiments, the polyamine crosslinker is aliphatic. Alternatively, aromatic polyamines can be utilized.

Useful polyamines are of the general formula $R^5(NR^1R^2)_x$ wherein $R_1$ and $R^2$ are independently H or alkyl, $R^5$ is a polyvalent alkylene or arylene, and x is at least two. The alkyl groups of $R^1$ and $R^2$ are typically $C_1$ to $C_{18}$ alkyl, more typically $C_1$ to $C_4$ alkyl, and most typically methyl. $R^1$ and $R^2$ may be taken together to form a cyclic amine. In some embodiment x is two (i.e. diamine). In other embodiments, x is 3 (i.e., triamine). In yet other embodiments, x is 4.

Examples include hexamethylene diamine; 1,10-diaminodecane; 1,12-diaminododecane; 2-(4-aminophenyl)ethylamine; isophorone diamine; 4,4'-diaminodicyclohexylmethane; and 1,3-bis(aminomethyl)cyclohexane. Illustrative six-member ring diamines include for example piperazine and 1,4-diazabicyclo [2.2.2]octane ("DABCO").

Other useful polyamines include polyamines having at least three amino groups, wherein the three amino groups are primary, secondary, or a combination thereof. Examples include 3,3'-diaminobenzidine, hexamethylene triamine, and triethylene tetramine.

The specific composition of the epoxy resin can be selected based on its intended end use. For example, in one embodiment, the resin composition can be for insulation, as described in US 2014/0080940, the disclosure of which is incorporated herein by reference thereto.

The resin composition may optionally further comprise additives including (e.g., silane-treated, or untreated) fillers, anti-sag additives, thixotropes, processing aids, waxes, and UV stabilizers. Examples of typical fillers include glass bubbles, fumed silica, mica, feldspar, and wollastonite. In some embodiments, the resin composition further comprises other thermally conductive fillers such as aluminum oxide, aluminum hydroxide, fused silica, zinc oxide, aluminum nitride, silicon nitride, magnesium oxide, beryllium oxide, diamond, and copper.

Methyl Methacrylates (MMA) Adhesives

Methyl methacrylate (MMA) adhesives of example embodiments can include one-part and two-part MMA adhesives. One-part MMA adhesives can include a resin. Two-part methyl methacrylates (MMA) adhesives have a faster strength build up than epoxies. MMA adhesives are commonly used for bonding plastics and bonding metals to plastics. They are also extremely effective in joining solid surface materials together, and as they can be colored, they are used extensively in worktop manufacture and installation.

Methyl methacrylate adhesives are structural acrylic adhesives that are made of a Part A (Part 1) resin and Part B (Part 2) hardener. Most MMAs also contain rubber and additional strengthening agents. MMAs cure quickly at room temperature and have full bond strength soon after application. The adhesive is resistant to shear, peel, and impact stress. Looking at the bonding process more technically, these adhesives work by creating an exothermic polymerization reaction. Polymerization is the process of reacting monomer molecules together, in a chemical reaction, to form polymer chains. What this means is that the adhesives create a strong bond while still being flexible. These adhesives can form bonds between dissimilar materials with different flexibility, like metal and plastic. Unlike some other structural adhesives like two-part epoxies, MMAs do not require heat to cure. There are MMAs available with a range of working times to suit your specific needs.

MMAs have higher peel strength and are more temperature resistant. They develop strength faster allowing parts to be used sooner. It is also worth noting the different processing conditions used for MMAs. For example, the two components of MMAs can each be applied separately to one of the materials being bonded together, and the MMA will not begin to cure until the joints are brought together, combining the components. This means that you do not have to deal with precise mixing ratios to get a good bond. It is important to remember that MMAs do tend to have a strong smell, meaning you should have good ventilation when applying them and they are flammable, so some care is needed.

MMAs are formulated to have a Work Life between 5 minutes and 20 minutes.

All these acrylic structural adhesive types provide exceptional bond strength and durability-nearly that of epoxy adhesives—but with the advantages of having faster cure speed, being less sensitive to surface preparation, and bonding more types of materials.

Silicone Adhesives

Silicone adhesives of example embodiments can include one-part and two-part silicone adhesives. Two-part silicone adhesives are generally used when there is a large bond area or when there is not enough relative humidity to complete the cure. Common applications for these are electronics applications including the manufacture of household appliances, in automotive and window manufacture.

Suitable silicone resins include moisture-cured silicones, condensation-cured silicones, and addition-cured silicones, such as hydroxyl-terminated silicones, silicone rubber, and fluoro-silicone. Examples of suitable commercially available silicone PSA compositions comprising silicone resin include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), PSA 529, PSA 750-$D_1$, PSA 825-D1, and PSA 800-C. An example of two-part silicone resin commercially available is that sold under the trade designation "SILASTIC J" from Dow Chemical Company, Midland, Mich.

Pressure sensitive adhesives (PSAs) can include natural or synthetic rubbers such as styrene block copolymers (styrene-butadiene; styrene-isoprene; styrene-ethylene/butylene block copolymers); nitrile rubbers, synthetic polyisoprene, ethylene-propylene rubber, ethylene-propylene-diene monomer rubber (EPDM), polybutadiene, polyisobutylene, butyl rubber, styrene-butadiene random copolymers, and combinations thereof.

Additional pressure sensitive adhesives include poly(alpha-olefins), polychloroprene, and silicone elastomers. In some embodiments, polychloroprene and silicone elastomers may be preferred since polychloroprene contains a halogen, which can contribute towards flame resistance, and silicone elastomers are resistant to thermal degradation.

Urethane Adhesives

Example urethane adhesives as used in embodiments can include both one-part and two-part urethane adhesives. Two-part urethane adhesives can be formulated to have a wide range of properties and characteristics when cured. They are often used when bonding dissimilar materials such as glass to metal or aluminum to steel, for example.

Most polyurethane adhesives are either polyester or polyether based. They are present in the isocyanate prepolymers and in the active hydrogen containing hardener component (polyol). They form the soft segments of the urethane, whereas the isocyanate groups form the hard segments. The soft segments usually comprise the larger portion of the elastomeric urethane adhesive and, therefore, determine its physical properties. For example, polyester-based urethane adhesives have better oxidative and high temperature stability than polyether-based urethane adhesives, but they have lower hydrolytic stability and low-temperature flexibility. However, polyethers are usually more expensive than polyesters.

Many urethane adhesives are sold as two-component urethane adhesives. The first component contains the diisocyanates and/or the isocyanate prepolymers (Part 1), and the second consists of polyols (and amine/hydroxyl chain extenders) (Part 2). A catalyst is often added, usually a tin salt or a tertiary amine, to speed up cure. The reactive ingredients are often blended with additives, and plasticizers to achieve the desired processing and/or final properties, and to reduce cost.

Polyurethanes may be prepared, for example, by the reaction of one or more polyols and/or polyamines and/or aminoalcohols with one or more polyisocyanates, optionally in the presence of non-reactive component(s). For applications where weathering is likely, it is typically desirable for the polyols, polyamines, and/or aminoalcohols and the polyisocyanates to be free of aromatic groups.

Suitable polyols include, for example, materials commercially available under the trade designation DESMOPHEN from Bayer Corporation, Pittsburgh, Pa. The polyols can be polyester polyols (for example, Desmophen 631A, 650A, 651A, 670A, 680, 110, and 1150); polyether polyols (for example, Desmophen 550U, 1600U, 1900U, and 1950U); or acrylic polyols (for example, Demophen A160SN, A575, and A450BA/A).

Suitable polyamines include, for example: aliphatic polyamines such as, for example, ethylene diamine, 1,2-diaminopropane, 2,5-diamino-2,5-dimethylhexane, 1,11-diaminoundecane, 1,12-diaminododecane, 2,4- and/or 2,6-hexahydrotoluylenediamine, and 2,4'-diamino-dicyclohexylmethane; and aromatic polyamines such as, for example, 2.4- and/or 2,6-diaminotoluene and 2,4'- and/or 4,4'-diaminodiphenylmethane; amine-terminated polymers such as, for example, those available from Huntsman Chemical (Salt Lake City, Utah), under the trade designation JEFFAMINE polypropylene glycol diamines (for example, Jeffamine XTJ-510) and those available from Noveon Corp., Cleveland, Ohio, under the trade designation Hycar ATBN (amine-terminated acrylonitrile butadiene copolymers), and those disclosed in U.S. Pat. No. 3,436,359 (Hubin et al.) and U.S. Pat. No. 4,833,213 (Leir et al.) (amine-terminated polyethers, and polytetrahydrofuran diamines); and combinations thereof.

Suitable aminoalcohols include, for example, 2-aminoethanol, 3-aminopropan-1-ol, alkyl-substituted versions of the foregoing, and combinations thereof.

Suitable polyisocyanate compounds include, for example: aromatic diisocyanates (for example, 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3',5,5'-tetraethyl)diphenylmethane; 4,4'-diisocyanato-3,3'-dimethoxybiphenyl (o-dianisidine diisocyanate); 5-chloro-2,4-toluene diisocyanate; and 1-chloromethyl-2,4-diisocyanato benzene), aromatic-aliphatic diisocyanates (for example, m-xylylene diisocyanate and tetramethyl-m-xylylene diisocyanate); aliphatic diisocyanates (for example, 1,4-diisocyanatobutane; 1,6-diisocyanatohexane; 1,12-diisocyanatododecane; and 2-methyl-1,5-diisocyanatopentane); cycloaliphatic diisocyanates (for example, methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), polymeric or oligomeric compounds (for example, polyoxyalkylene, polyester, polybutadienyl, and the like) terminated by two isocyanate functional groups (for example, the diurethane of toluene-2,4-diisocyanate-terminated polypropylene oxide glycol); polyisocyanates commercially available under the trade designation MONDUR or DESMODUR (for example, Desmodur XP7100 and Desmodur N 3300A) from Bayer Corporation (Pittsburgh, Pa.); and combinations thereof.

In some embodiments, the polyurethane comprises a reaction product of components comprising at least one polyisocyanate and at least one polyol. In some embodiments, the polyurethane comprises a reaction product of components comprising at least one polyisocyanate and at least one polyol. In some embodiments, the at least one polyisocyanate comprises an aliphatic polyisocyanate. In some embodiments, the at least one polyol comprises an aliphatic polyol. In some embodiments, the at least one polyol comprises a polyester polyol or a polycarbonate polyol.

Typically, the polyurethane(s) is/are extensible and/or pliable. For example, the polyurethane(s), or any layer containing polyurethane, may have a percent elongation at break (at ambient conditions) of at least 10, 20, 40, 60, 80, 100, 125, 150, 175, 200, 225, 250, 275, 300, 350, or even at least 400 percent, or more.

In certain embodiments, the polyurethane has hard segments, typically segments corresponding to one or more polyisocyanates, in any combination, in an amount of from 35, 40, or 45 percent by weight up to, 50, 55, 60, or even 65 percent by weight.

As used herein: wt % means percent by weight based on the total weight of material, and Hard Segment wt %=(weight of short chain diol and polyol+weight of short chain di- or polyisocyanate)/total weight of resin wherein:

short chain diols and polyols have an equivalent weight≤185 g/eq, and a functionality≥2; and short chain isocyanates have an equivalent weight≤3 20 g/eq and a functionality ≥2.

One or more catalysts are typically included with two-part urethanes. Catalysts for two-part urethanes are well known and include, for example, aluminum-, bismuth-, tin-, vanadium-, zinc-, tin-, and zirconium-based catalysts. Tin-based catalysts have been found to significantly reduce the amount of outgassing during formation of the polyurethane. Examples of tin-based catalysts include dibutyltin compounds such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonite, and dibutyltin oxide. If present, any catalyst is typically included at levels of at least 200 parts per million by weight (ppm), 300 ppm, or more; however, this is not a requirement.

Additional suitable two-part urethanes are described in U.S. Pat. No. 6,258,918 B1 (Ho et al.) and U.S. Pat. No. 5,798,409 (Ho), the disclosures of which are incorporated herein by reference.

In general, the amounts of polyisocyanate to polyol, polyamine, and/or aminoalcohol in a two-part urethane are selected in approximately stoichiometrically equivalent amounts, although in some cases it may be desirable to adjust the relative amounts to other ratios. For example, a slight stoichiometric excess of the polyisocyanate may be useful to ensure a high degree of incorporation of the polyol, polyamine, and/or aminoalcohol, although any excess isocyanate groups present after polymerization will typically react with materials having reactive hydrogens (for example, adventitious moisture, alcohols, amines, etc.).

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. This disclosure is not intended to be unduly limited by the illustrative embodiments and examples set forth herein and that such examples and embodiments are presented by way of example only with the scope of the disclosure intended to be limited only by the claims set forth herein as follows.

Exemplary Embodiments

Embodiments of the disclosure are defined in the claims. However, below there is provided a non-exhaustive listing of non-limiting examples. Any one or more of the features of these examples may be combined with any one or more features of another example, embodiment, or aspect described herein.

Embodiment 1 is an apparatus for dispensing a liquid, the apparatus comprising a dispenser configured to dispense a liquid in a dispense operation at a dispense rate from a start point on a substrate surface to a terminate point on the substrate surface. The apparatus further comprises a measurement device configured to detect geometric parameters of a shape formed by the dispensed liquid on the substrate surface. The apparatus further comprises control circuitry coupled to the measurement device and configured to control at least one of an approach speed at which the dispenser approaches the start point prior to the dispense operation and an exiting speed at which the dispenser moves away from the terminate point subsequent to the dispense operation based on the detected geometric parameters of the shape.

Embodiment 2 is the apparatus according to Embodiment 1, wherein the dispense operation includes dispensing liquid.

Embodiment 3 is the apparatus according to one or more of Embodiment 1 to Embodiment 2, wherein the control circuitry is further configured to control a dispensing speed at which the dispenser moves over the substrate surface while dispensing the liquid.

Embodiment 4 is the apparatus according to one or more of Embodiment 1 to Embodiment 3, wherein the control circuitry is further configured to adjust the approach speed or the exiting speed based on the geometric parameters.

Embodiment 5 is the apparatus according to one or more of Embodiment 1 to Embodiment 4, wherein the measurement device includes a three-dimensional scanner to detect shape of a bead of dispensed liquid.

Embodiment 6 is the apparatus according to one or more of Embodiment 1 to Embodiment 5, wherein the control circuitry is further configured to adjust the approach speed or a dispensing speed according to a learning algorithm.

Embodiment 7 is the apparatus according to one or more of Embodiment 1 to Embodiment 6, wherein the geometric parameters include at least one of bead height of a dispensed bead of liquid, bead width of a bead of dispensed liquid, and bead section area of the bead of dispensed liquid.

Embodiment 8 is the apparatus according to one or more of Embodiment 1 to Embodiment 7, wherein the control circuitry is configured to control approach speed $v_{apprnew}$ according to $$v_{apprnew} = \left(\frac{W_h}{W_m}\right)^2 \cdot V_{appr} \cdot k,$$

where k is a speed multiplier that varies based on dispenser cycle time, $W_h$ is maximum head width of the bead of dispensed liquid, and $W_m$ is an average middle width of the bead of dispensed liquid.

Embodiment 9 is the apparatus according to one or more of Embodiment 1 to Embodiment 8, wherein the control circuitry is configured to control approach speed $v_{apprnew}$ according to $$v_{apprnew} = \frac{1}{2}\left[\left(\frac{W_h}{W_m}\right)^2 + \left(\frac{H_h}{H_m}\right)^2\right] \cdot V_{appr} \cdot k,$$

where k is a speed multiplier that varies based on dispenser cycle time, $W_h$ is maximum head width of the bead of dispensed liquid, $W_m$ is an average middle width of the bead of dispensed liquid, $H_h$ is a maximum head height of the bead of dispensed liquid, and $H_m$ is an average middle height of the bead of dispensed liquid.

Embodiment 10 is the apparatus according to one or more of Embodiment 1 to Embodiment 9, wherein the control circuitry is configured to control exiting speed $v_{exitrnew}$ according to $$v_{exitnew} = \left(\frac{W_e}{W_m}\right)^2 \cdot V_{exit} \cdot k,$$

where k is a speed multiplier that varies based on dispenser cycle time, $W_e$ is maximum end width of the bead of dispensed liquid, and $W_m$ is an average middle width of the bead of dispensed liquid.

Embodiment 11 is the apparatus according to one or more of Embodiment 1 to Embodiment 10, wherein the control circuitry is configured to control exiting speed $v_{exitnew}$ according to $$v_{exitnew} = \frac{1}{2}\left[\left(\frac{W_e}{W_m}\right)^2 + \left(\frac{H_e}{H_m}\right)^2\right] \cdot V_{exit} \cdot k,$$

where k is a speed multiplier that varies based on dispenser cycle time, $W_e$ is maximum end width of the bead of dispensed liquid, $W_m$ is an average middle width of the bead of dispensed liquid, $H_e$ is a maximum end height of the bead of dispensed liquid, and $H_m$ is an average middle height of the bead of dispensed liquid.

Embodiment 12 is the apparatus according to one or more of Embodiment 1 to Embodiment 11, wherein the control circuitry is further configured to adjust dispense on time according to a valve delay value.

Embodiment 13 is the apparatus according to one or more of Embodiment 1 to Embodiment 12, further comprising a memory configured to store data related to one or more of a dispenser configuration, liquid properties, and substrate dimensions.

Embodiment 14 is the apparatus according to Embodiment 13, wherein the dispenser configuration includes one or more of pump settings, valve settings, pipe settings, and nozzle settings.

Embodiment 15 is the apparatus according to Embodiment 13, wherein the control circuitry is further configured to retrieve the data from the memory; and control dispenser operations based on the data.

Embodiment 16 is the apparatus according to Embodiment 15, wherein the control circuitry is further configured to adjust control based on one or more of an environmental factor and a liquid property.

Embodiment 17 is a method for dispensing liquid, the method comprising dispensing a liquid from a dispenser apparatus at a dispense rate from a start point on a substrate surface to a terminate point on the substrate surface; detecting geometric parameters of a shape formed by the dispensed liquid on the substrate surface; and controlling at least one of an approach speed at which the dispenser apparatus approaches the start point prior to a dispense operation and an exiting speed at which the dispenser apparatus moves away from the terminate point subsequent to the dispense operation based on the detected geometric parameters of the shape.

Embodiment 18 is the method according to Embodiment 17, wherein the dispense operation includes dispensing liquid.

Embodiment 19 is the method according to one or more of Embodiment 17 to Embodiment 18, further comprising controlling a dispensing speed at which the dispenser apparatus moves over the substrate surface while dispensing liquid.

Embodiment 20 is the method according to one or more of Embodiment 17 to Embodiment 19, further comprising adjusting the approach speed or the exiting speed based on the geometric parameters.

Embodiment 21 is the method according to one or more of Embodiment 17 to Embodiment 20, further comprising operating a three-dimensional scanner to detect a shape of a bead of dispensed liquid.

Embodiment 22 is the method according to one or more of Embodiment 17 to Embodiment 21, further comprising adjusting the approach speed or the exiting speed according to a learning algorithm.

Embodiment 23 is the method according to one or more of Embodiment 17 to Embodiment 22, wherein the geometric parameters include at least one of bead height of a bead of dispensed liquid, bead width of the bead of dispensed liquid, and bead section area of the bead of dispensed liquid.

Embodiment 24 is the method according to one or more of Embodiment 17 to Embodiment 23, further comprising controlling approach speed $v_{apprnew}$ according to $$v_{apprnew} = \left(\frac{W_h}{W_m}\right)^2 \cdot V_{appr} \cdot k,$$

where k is a speed multiplier that varies based on dispenser cycle time, $W_h$ is maximum head width of the bead of dispensed liquid, and $W_m$ is an average middle width of the bead of dispensed liquid.

Embodiment 25 is the method according to one or more of Embodiment 17 to Embodiment 24, further comprising controlling approach speed $v_{apprnew}$ according to $$v_{apprnew} = \frac{1}{2}\left[\left(\frac{W_h}{W_m}\right)^2 + \left(\frac{H_h}{H_m}\right)^2\right] \cdot V_{appr} \cdot k,$$

where k is a speed multiplier that varies based on dispenser cycle time, $W_h$ is maximum head width of the bead of dispensed liquid, $W_m$ is an average middle width of the bead of dispensed liquid, $H_h$ is a maximum head height of the bead of dispensed liquid, and $H_m$ is an average middle height of the bead of dispensed liquid.

Embodiment 26 is the method according to one or more of Embodiment 17 to Embodiment 25, further comprising controlling exiting speed $v_{exitrnew}$ according to $$v_{exitnew} = \left(\frac{W_e}{W_m}\right)^2 \cdot V_{exit} \cdot k,$$

where k is a speed multiplier that varies based on dispenser cycle time, $W_e$ is maximum end width of the bead of dispensed liquid, and $W_m$ is an average middle width of the bead of dispensed liquid.

Embodiment 27 is the method according to one or more of Embodiment 17 to Embodiment 26, further comprising controlling exiting speed $v_{exitnew}$ according to $$v_{exitnew} = \frac{1}{2}\left[\left(\frac{W_e}{W_m}\right)^2 + \left(\frac{H_e}{H_m}\right)^2\right] \cdot V_{exit} \cdot k,$$

where k is a speed multiplier that varies based on dispenser cycle time, $W_e$ is maximum end width of the bead of dispensed liquid, $W_m$ is an average middle width of the bead of dispensed liquid, $H_e$ is a maximum end height of the bead of dispensed liquid, and $H_m$ is an average middle height of the bead of dispensed liquid.

Embodiment 28 is the method according to one or more of Embodiment 17 to Embodiment 27, further comprising adjusting dispense "on" time according to a valve delay value.

Embodiment 29 is the method according to one or more of Embodiment 17 to Embodiment 28, further comprising storing, in a memory device, data related to one or more of a dispenser configuration, liquid properties, and substrate dimensions.

Embodiment 30 is the method according to Embodiment 29, wherein the dispenser configuration includes one or more of pump settings, valve settings, pipe settings, and nozzle settings.

Embodiment 31 is the method according to Embodiment 29, further comprising retrieving the data from the memory device; and controlling dispenser operations based on the data.

Embodiment 32 is the method according to Embodiment 31, further comprising adjusting control based on one or more of an environmental factor and a liquid property.

What is claimed is:

1. An apparatus for dispensing a liquid, the apparatus comprising:

a dispenser configured to dispense a liquid in a dispense operation at a dispense rate from a start point on a substrate surface to a terminate point on the substrate surface;

a measurement device configured to detect geometric parameters of a shape formed by the dispensed liquid on the substrate surface; and control circuitry coupled to the measurement device and configured to control at least one of an approach speed at which the dispenser approaches the start point prior to the dispense operation and an exiting speed at which the dispenser moves away from the terminate point subsequent to the dispense operation based on the detected geometric parameters of the shape.

2. The apparatus of claim 1, wherein the dispense operation includes dispensing liquid.

3. The apparatus according to claim 1, wherein the control circuitry is further configured to control a dispensing speed at which the dispenser moves over the substrate surface while dispensing the liquid.

4. The apparatus of claim 1, wherein the control circuitry is further configured to:

adjust the approach speed or the exiting speed based on the geometric parameters.

5. The apparatus of claim 1, wherein the measurement device includes a three-dimensional scanner to detect shape of a bead of dispensed liquid.

6. The apparatus of claim 1, wherein the control circuitry is further configured to adjust the approach speed or a dispensing speed according to a learning algorithm.

7. The apparatus of claim 1, wherein the geometric parameters include at least one of bead height of a dispensed bead of liquid, bead width of a bead of dispensed liquid, and bead section area of the bead of dispensed liquid.

8. The apparatus of claim 1, wherein the control circuitry is configured to control approach speed $v_{apprnew}$ according to $$v_{apprnew} = \left(\frac{W_h}{W_m}\right)^2 \cdot V_{appr} \cdot k,$$

where k is a speed multiplier that varies based on dispenser cycle time, $W_h$ is maximum head width of the bead of dispensed liquid, and $W_m$ is an average middle width of the bead of dispensed liquid.

9. The apparatus of claim 1, wherein the control circuitry is configured to control approach speed $v_{apprnew}$ according to $$v_{apprnew} = \frac{1}{2}\left[\left(\frac{W_h}{W_m}\right)^2 + \left(\frac{H_h}{H_m}\right)^2\right] \cdot V_{appr} \cdot k,$$

where k is a speed multiplier that varies based on dispenser cycle time, $W_h$ is maximum head width of the bead of dispensed liquid, $W_m$ is an average middle width of the bead of dispensed liquid, $H_h$ is a maximum head height of the bead of dispensed liquid, and $H_m$ is an average middle height of the bead of dispensed liquid.

10. The apparatus of claim 1, wherein the control circuitry is configured to control exiting speed $v_{exitrnew}$ according to $$v_{exitnew} = \left(\frac{W_e}{W_m}\right)^2 \cdot V_{exit} \cdot k,$$

where k is a speed multiplier that varies based on dispenser cycle time, $W_e$ is maximum end width of the bead of dispensed liquid, and $W_m$ is an average middle width of the bead of dispensed liquid.

11. The apparatus of claim 1, wherein the control circuitry is configured to control exiting speed $v_{exitnew}$ according to $$v_{exitnew} = \frac{1}{2}\left[\left(\frac{W_e}{W_m}\right)^2 + \left(\frac{H_e}{H_m}\right)^2\right] \cdot V_{exit} \cdot k,$$

where k is a speed multiplier that varies based on dispenser cycle time, $W_e$ is maximum end width of the bead of dispensed liquid, $W_m$ is an average middle width of the bead of dispensed liquid, $H_e$ is a maximum end height of the bead of dispensed liquid, and $H_m$ is an average middle height of the bead of dispensed liquid.

12. The apparatus of claim 1, wherein the control circuitry is further configured to adjust dispense on time according to a valve delay value.

13. The apparatus of claim 1, further comprising a memory configured to store data related to one or more of a dispenser configuration, liquid properties, and substrate dimensions.

14. The apparatus of claim 13, wherein the dispenser configuration includes one or more of pump settings, valve settings, pipe settings, and nozzle settings.

15. The apparatus of claim 13, wherein the control circuitry is further configured to:

retrieve the data from the memory; and control dispenser operations based on the data.

16. The apparatus of claim 15, wherein the control circuitry is further configured to adjust control based on one or more of an environmental factor and a liquid property.

17. A method for dispensing liquid, the method comprising:

dispensing a liquid from a dispenser apparatus at a dispense rate from a start point on a substrate surface to a terminate point on the substrate surface;

detecting geometric parameters of a shape formed by the dispensed liquid on the substrate surface; and controlling at least one of an approach speed at which the dispenser apparatus approaches the start point prior to a dispense operation and an exiting speed at which the dispenser apparatus moves away from the terminate point subsequent to the dispense operation based on the detected geometric parameters of the shape.

18. A computer-readable medium for storing operations that, when executed on control circuitry, cause the control circuitry to perform operations including:

dispensing a liquid at a dispense rate from a start point on a substrate surface to a terminate point on the substrate surface;

detecting geometric parameters of a shape formed by the dispensed liquid on the substrate surface; and controlling at least one of an approach speed at which a dispenser apparatus approaches the start point prior to a dispense operation and an exiting speed at which the dispenser apparatus moves away from the terminate point subsequent to the dispense operation based on the detected geometric parameters of the shape.

* * * * *